(12) United States Patent
Smirnov

(10) Patent No.: US 12,164,114 B2
(45) Date of Patent: Dec. 10, 2024

(54) CAMERA MODULE

(71) Applicant: Samsung Electro-Mechanics Co., Ltd., Suwon-si (KR)

(72) Inventor: Viatcheslav Smirnov, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 623 days.

(21) Appl. No.: 17/397,104

(22) Filed: Aug. 9, 2021

(65) Prior Publication Data

US 2022/0179228 A1 Jun. 9, 2022

(30) Foreign Application Priority Data

Dec. 7, 2020 (KR) ........................ 10-2020-0169869

(51) Int. Cl.
*G02B 27/64* (2006.01)
*G03B 5/00* (2021.01)
*H04N 23/68* (2023.01)

(52) U.S. Cl.
CPC ............. *G02B 27/646* (2013.01); *G03B 5/00* (2013.01); *G03B 2205/0007* (2013.01); *H04N 23/687* (2023.01)

(58) Field of Classification Search
CPC .................. G02B 27/646; G03B 5/00; G03B 2205/0007; H04N 23/687
USPC ....................................................... 359/822
See application file for complete search history.

(56) References Cited

U.S. PATENT DOCUMENTS

| | | | |
|---|---|---|---|
| 9,933,629 | B2 | 4/2018 | Minamisawa |
| 2006/0033818 | A1 | 2/2006 | Wada et al. |
| 2010/0202766 | A1 | 8/2010 | Takizawa et al. |
| 2015/0195459 | A1 | 7/2015 | Yeo |
| 2017/0176766 | A1 | 6/2017 | Sue et al. |

(Continued)

FOREIGN PATENT DOCUMENTS

| | | | |
|---|---|---|---|
| CN | 101685235 A | | 3/2010 |
| CN | 101772730 A | | 7/2010 |

(Continued)

OTHER PUBLICATIONS

Korean Office Action issued on Apr. 29, 2022, in the counterpart Korean Patent Application No. 10-2020-0169869. (6 pages in English and 5 pages in Korean).

(Continued)

*Primary Examiner* — Wyatt A Stoffa
*Assistant Examiner* — Grant A Gagnon
(74) *Attorney, Agent, or Firm* — NSIP Law

(57) ABSTRACT

A camera module includes a lens module, a first movable member, a second movable member, a fixed member, a first driving unit, and a second driving unit. The first movable member is coupled to the lens module and configured to rotate about a first axis virtually intersecting an optical axis of the lens module. The second movable member, supporting the first movable member, is configured to rotate about a second axis virtually intersecting the optical axis. The fixed member is configured to support the second movable member. The first driving unit, configured to provide a first driving force required to rotate the first movable member, includes a first driving magnet disposed on the first movable member. The second driving unit, configured to provide a second driving force required to rotate the second movable member, includes a second driving magnet disposed on the second movable member.

16 Claims, 12 Drawing Sheets

(56) References Cited

U.S. PATENT DOCUMENTS

2018/0129066 A1    5/2018  Minamisawa et al.
2018/0348538 A1   12/2018  Sugawara

FOREIGN PATENT DOCUMENTS

| CN | 104508550 A | 4/2015 |
|----|-------------|--------|
| CN | 108073012 A | 5/2018 |
| CN | 108292076 A | 7/2018 |
| JP | 2005-345665 A | 12/2005 |
| JP | 2006-295553 A | 10/2006 |
| JP | 2010-078842 A | 4/2010 |
| JP | 2013-041026 A | 2/2013 |
| JP | 6637756 B2 | 1/2020 |
| KR | 10-2018-0102788 A | 9/2018 |
| KR | 10-2020-0088729 A | 7/2020 |

OTHER PUBLICATIONS

Chinese Office Action issued on Mar. 12, 2024, in counterpart Chinese Patent Application No. 202111184901.7 (5 pages in English, 9 pages in Chinese).

III-III

CAMERA MODULE

CROSS-REFERENCE TO RELATED APPLICATION

This application claims the benefit under 35 USC 119(a) of Korean Patent Application No. 10-2020-0169869 filed on Dec. 7, 2020, in the Korean Intellectual Property Office, the entire disclosure of which is incorporated herein by reference for all purposes.

BACKGROUND

1. Field

The following description relates to a camera module having optical image stabilization.

2. Description of Related Art

Camera modules are configured to enable clear imaging. For example, a camera module includes an image stabilization unit capable of correcting the shaking of the lens module due to external impacts. The image stabilization unit is configured to move the lens module in a direction intersecting the optical axis. For example, the image stabilization unit may significantly reduce the shaking of the lens module by exerting driving force on one side or the other side of the lens module.

The camera module having the image stabilization function is configured to enable movement of the lens module. For example, the lens module of the above-described camera module may move in a direction intersecting the optical axis. However, excessive movement of the lens module may cause a collision between the lens module and a housing accommodating the lens module, and thus the camera module may fail. For example, when the camera module is excessively shaken by a user or an impact is applied to the camera module, the lens module may be damaged, or the camera module may be damaged.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens module, a first movable member, a second movable member, a fixed member, a first driving unit, and a second driving unit. The first movable member is coupled to the lens module and configured to rotate about a first axis intersecting an optical axis of the lens module. The second movable member, supporting the first movable member, is configured to rotate about a second axis intersecting the optical axis. The fixed member is configured to support the second movable member. The first driving unit, configured to provide a first driving force required to rotate the first movable member, includes a first driving magnet disposed on the first movable member. The second driving unit, configured to provide a second driving force required to rotate the second movable member, includes a second driving magnet disposed on the second movable member.

The first driving force and the second driving force may be in directions intersecting each other.

The first axis and the second axis may be formed passing through midpoints of opposite sides of the fixed member or a width direction of the fixed member.

The first axis and the second axis may be formed passing through opposite vertices of the fixed member or in a diagonal direction of the fixed member.

The first movable member, the second movable member, and the fixed member may be sequentially disposed in the optical axis direction.

The camera module may further include a first support member disposed between the first movable member and the second movable member, and a second support member disposed between the second movable member and the fixed member.

The first support member and the second support member may each be provided with a groove enabling deformation of the first and second support members.

The first support member and the second support member may protrude in the optical axis direction.

The camera module may further include a housing accommodating the first movable member, the second movable member, and the fixed member.

The first driving unit may further include a first driving coil disposed on one side of the housing to face the first driving magnet. The second driving unit may further include a second driving coil disposed on another side of the housing to face the second driving magnet.

In another general aspect, a camera module include a lens module including one or more lenses disposed in an optical axis, a movable member configured to support the lens module to rotate about a first axis intersecting the optical axis, a fixed member configured to support the movable member to rotate about a second axis intersecting the optical axis, a first driving unit including a first driving magnet disposed on the lens module, and a second driving unit including a second driving magnet disposed on the movable member.

The camera module may further include a first support member disposed on the first movable member or the second movable member and disposed in a direction of the first axis, and a second support member disposed on the second movable member or the third movable member and disposed in a direction of the second axis.

The first driving magnet may be disposed on a plurality of different side surfaces of the lens module.

The second driving magnet may be disposed on a plurality of different side surfaces of the movable member.

One first driving magnet and one second driving magnet of the different side surfaces may be disposed to provide driving force to a same side surface of the lens module.

The first axis and the second axis may be disposed in a diagonal direction of the fixed member.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
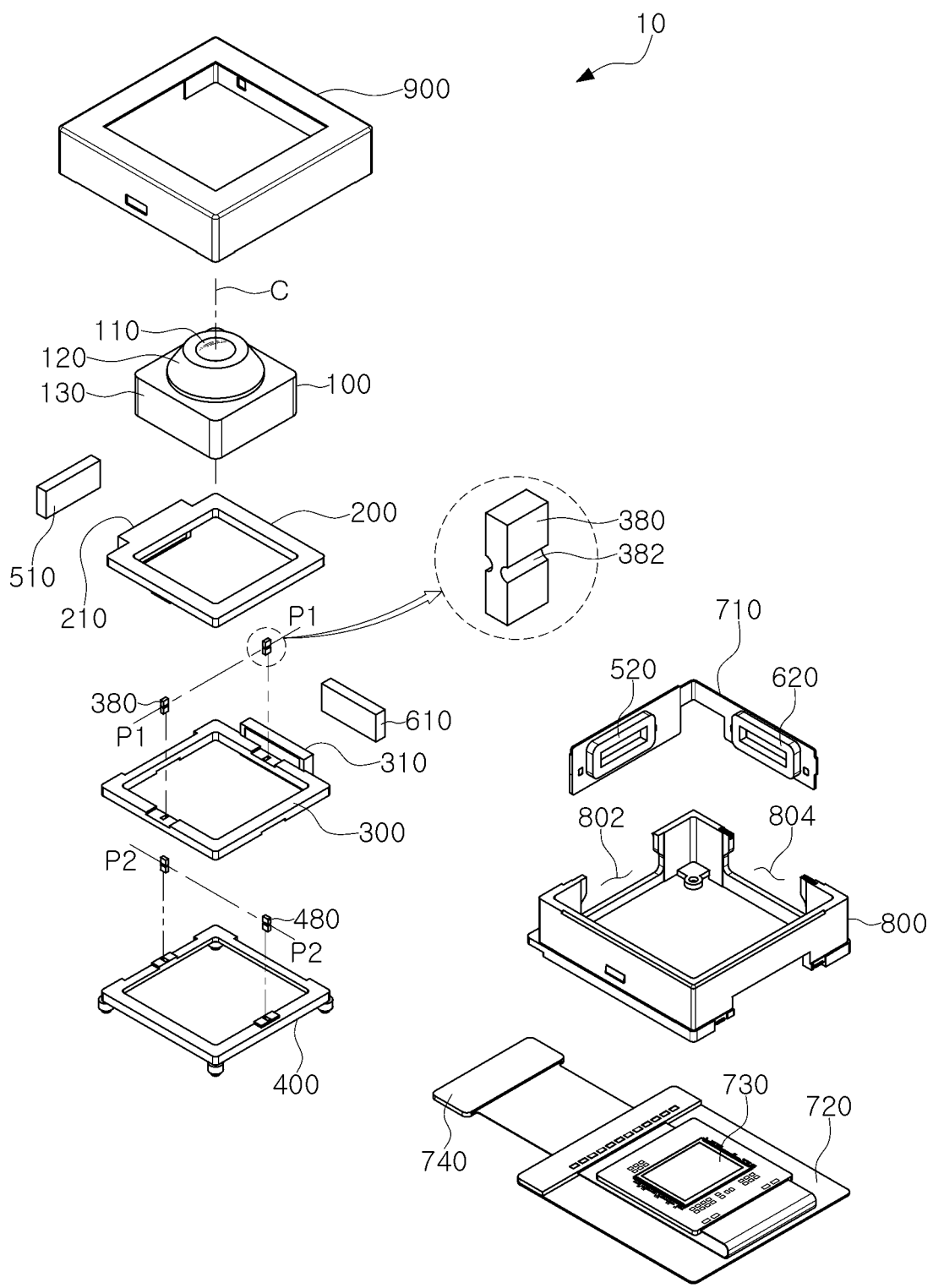
FIG. 1 is an exploded perspective view of a camera module, according to an example.
Figure 2:
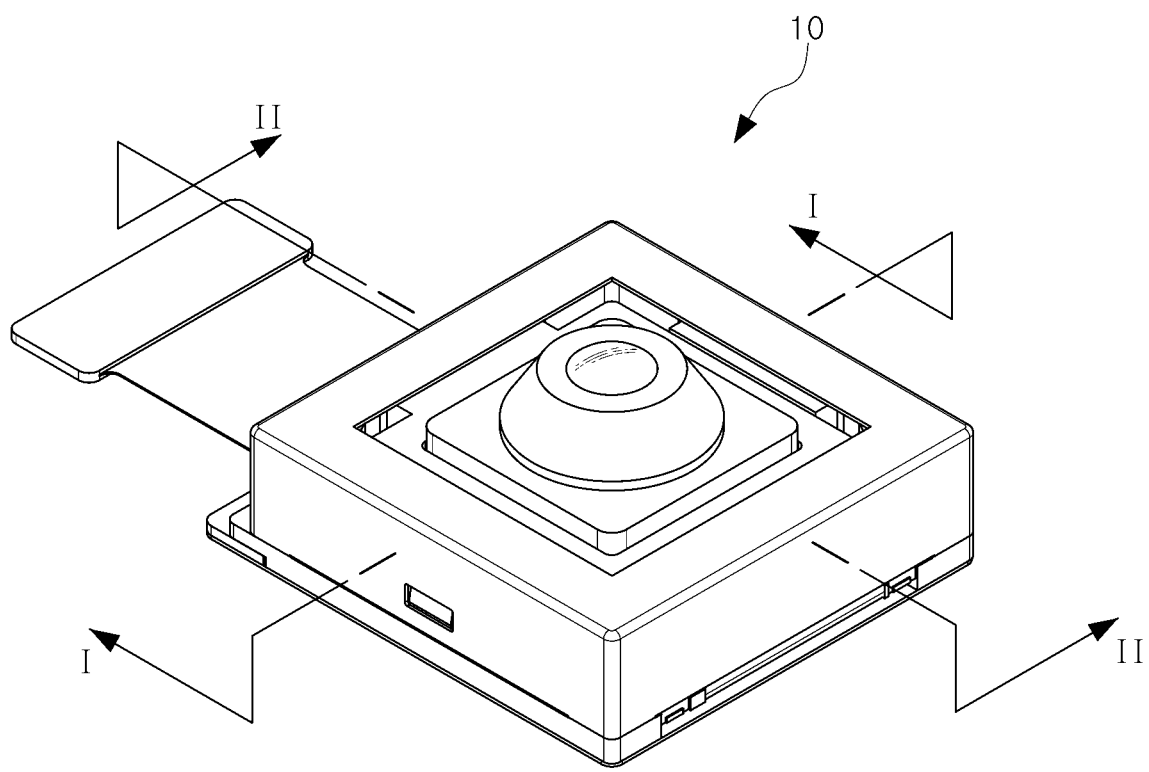
FIG. 2 is a perspective view illustrating the camera module illustrated in FIG. 1.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depictions of elements in the drawings may be exaggerated for clarity, illustration, and convenience.

An aspect of the present disclosure is to provide a camera module configured to significantly reduce movement of a lens module due to external impacts while providing an optical image stabilization function.

A camera module described herein may be mounted on a portable electronic product. For example, the camera module may be mounted on a portable telephone, a notebook computer, or the like. Still, the range of use of the camera module is not limited to the aforementioned electronic devices. For example, the camera module may be mounted on all electronic devices that require screen imaging and video recording, such as motion detection, image capture, face recognition, iris recognition, virtual reality realization, and augmented reality realization.

The camera module includes an optical image stabilization (OIS) function to alleviate the reduction in resolution caused by hand shake. For example, the camera module is configured to drive the lens module in a direction intersecting the optical axis. In the case of the camera module including the OIS function, the lens module may be driven in a direction intersecting the optical axis, and thus, the lens module may be damaged by colliding with the housing due to external impacts, or noise may be generated by the rapid movement of the lens module.

The camera module described herein may be configured to prevent the above-described problem. For example, the camera module may perform optical image stabilization (OIS) through the trajectory motion of the lens module. In detail, the camera module may perform OIS by rotating the lens module around a plurality of axes. Accordingly, in the camera module, since the lens module does not move in a direction facing the housing, noise and damage caused by collisions between the lens module and the housing may be reduced.

According to an example, a camera module includes a lens module, a movable member, and a fixed member enabling the lens module to move in a direction intersecting an optical axis, and a driving unit providing driving force required for driving the movable member.

The movable member may be configured in plural. For example, the movable member may comprise a first movable member and a second movable member. The first movable member is configured to rotate about a virtual first axis intersecting the optical axis of the lens module, and the second movable member is configured to rotate about a virtual second axis intersecting the optical axis of the lens module.

The fixed member is configured to support one or more of the movable members. For example, the fixed member may support the second movable member such that rotation of the second movable member is smoothly performed.

The driving unit may be comprised of a plurality of driving units. For example, the driving unit may include a first driving unit providing the driving force required to rotate the first movable member and a second driving unit providing driving force required to rotate the second movable member. In addition, the driving unit may include one or more driving magnets. For example, the first driving unit may include a first driving magnet disposed on the first movable member. The second driving unit may include a second driving magnet disposed on the second movable member.

The first driving unit and the second driving unit may be disposed to generate driving force in directions intersecting each other. For example, the first driving unit may be disposed to generate driving force in the direction of the first side of the lens module, and the second driving unit may be disposed to generate driving force in the direction of the second side of the lens module. However, the arrangement of the first driving unit and the second driving unit is not limited to the above-described configuration. For example, the arrangement of the first driving unit and the second driving unit may be changed within a range in which image stabilization is possible through the driving force of the first driving unit and the second driving unit.

The driving unit may further include a driving coil. For example, the first driving unit may further include a first driving coil, and the second driving unit may further include a second driving coil. The driving coil may be disposed to face the driving magnet. For example, the first driving coil may be disposed to face the first driving magnet, and the second driving coil may be disposed to face the second driving magnet. The driving coil may be disposed on a member receiving the movable member and the fixed member. For example, the driving coil may be disposed directly or indirectly in a housing configured to receive a movable member and a fixed member.

The virtual first axis and the virtual second axis may be formed in different directions. For example, the virtual first axis may be formed in a first short axis direction or a first width direction of the fixed member. The virtual second axis may be formed in a second short axis direction or a second width direction of the fixed member. As another example, the virtual first axis may be formed in the first major axis direction or a first diagonal direction of the fixed member, and the virtual second axis may be formed in a second major axis direction or a second diagonal direction of the fixed member.

The first movable member, the second movable member, and the fixed member may be sequentially disposed in the optical axis direction. For example, the first movable member, the second movable member, and the fixed member may be sequentially disposed from the object side toward an image plane (or an image sensor). In detail, the second movable member may be disposed below the first movable member, and the fixed member may be disposed below the second movable member. However, the arrangement order of the first movable member, the second movable member, and the fixed member is not limited to the above-described form. For example, the second movable member, the first movable member, and the fixed member may also be disposed in the order.

The camera module may further include a support member. For example, the camera module may include a first support member disposed between the first movable member and the second movable member, and a second support member disposed between the second movable member and the fixed member.

The support member may be configured to enable a rotational movement of the first movable member and the second movable member. For example, the first support member may enable a relative rotational movement of the first movable member with respect to the second movable member. The second support member may enable a relative rotational movement of the second movable member with respect to the fixed member. The support member may be fitted into a groove of the movable member. For example, the first support member may be fitted into a first groove of the first movable member, and the second support member may be fitted into a second groove of the second movable member. The support member may be in substantially rolling contact with the movable member. For example, one end of the support member may be formed to have a curved surface to enable rotational movement of the movable member. The support member may extend in the optical axis direction.

The support member may be formed to facilitate bending deformation. For example, the groove for enabling bending deformation of the support member may be formed in some regions of the first support member and the second support member, respectively.

According to another example, a camera module includes a lens module, a movable member, a fixed member enabling the lens module to move in a direction intersecting an optical axis, and a driving unit providing driving force required to drive the movable member.

The lens module includes one or more lenses disposed along the optical axis. For example, the lens module may include four or more lenses. However, the number of lenses constituting the lens module is not limited to four. For example, the lens module may include 3 or less or 5 or more lenses sequentially disposed in ascending numerical order along the optical axis from an object side of the optical imaging system toward an imaging plane of the lens module, with the first lens being closest to the object side of the lens module and the last lens being closest to the imaging plane.

The lenses may be spaced apart from each other by predetermined distances along the optical axis. The lens module may be configured to be rotated about a virtual first axis intersecting the optical axis.

The movable member is configured to support the lens module. For example, the movable member may support the lens module to enable the lens module's trajectory or rotational motion. In addition, the movable member may be configured to rotate in a direction different from that of the lens module. For example, the movable member may be configured to rotate about a virtual second axis intersecting the optical axis.

The fixed member is configured to support the movable member. For example, the fixed member may support the movable member such that the trajectory or rotational motion of the movable member may be smoothly performed.

The driving unit may be comprised of a plurality of driving units. For example, the driving unit may include a first driving unit providing the driving force required to rotate the lens module and a second driving unit providing driving force required to rotate the movable member. In addition, the driving unit may include one or more driving magnets. For example, the first driving unit may include a first driving magnet disposed on the lens module, and the second driving unit may include a first driving magnet disposed on the movable member.

The first driving unit and the second driving unit may be disposed to generate driving force in directions intersecting each other. The first driving unit may generate driving force such that the lens module rotates about a virtual first axis, and the second driving unit may generate driving force such that the movable member rotates about a virtual second axis.

The first driving magnet and the second driving magnet may be formed on a plurality of different side surfaces of the lens module and the movable member. For example, the first driving magnet may be respectively formed on the first side and the second side of the lens module, and the second driving magnet may be respectively formed on the first side and the second side of the movable member. One of the first driving magnets disposed on the first side and the second side of the lens module may generate driving force in the same direction as that of one of the second driving magnets disposed on the first side and the second side of the lens module. For example, the first side of the lens module may be a portion in the same direction as the first side of the movable member, but the second side of the lens module and the second side of the movable member may be portions in different directions.

The driving unit may further include a driving coil. For example, the first driving unit may further include a first driving coil, and the second driving unit may further include a second driving coil. The driving coil may be disposed to face the driving magnet. For example, the first driving coil may be disposed to face the first driving magnet, and the second driving coil may be disposed to face the second driving magnet. The driving coil may be disposed on a member receiving the movable member and the +fixed member. For example, the driving coil may be disposed directly or indirectly in a housing configured to receive a movable member and a fixed member.

The virtual first axis and the virtual second axis may be formed in different directions. For example, the virtual first axis may be formed in the first short axis direction or the first width direction of the fixed member, and the virtual second axis may be formed in the second short axis direction or the second width direction of the fixed member. As another example, the virtual first axis may be formed in the first major axis direction or the first diagonal direction of the fixed member, and the virtual second axis may be formed in the second major axis direction or the second diagonal direction of the fixed member.

The camera module may further include a support member. For example, the camera module may include a first support member disposed between the first movable member and the second movable member, and a second support member disposed between the second movable member and the fixed member.

The support member may be configured to enable the rotational movement of the first movable member and the second movable member. For example, the first support member may enable a relative rotational movement of the first movable member with respect to the second movable member. The second support member may enable a relative rotational movement of the second movable member with respect to the fixed member. The support member may be fitted into a groove of the movable member. For example, the first support member may be fitted into a first groove of the first movable member, and the second support member may be fitted into a second groove of the second movable member. The support member may be in substantially rolling contact with the movable member. For example, one end of the support member may be formed to have a curved surface to enable rotational movement of the movable member. The support member may extend in the optical axis direction.

Hereinafter, examples will be described in detail based on the accompanying drawings.

First, a camera module according to an example will be described with reference to FIGS. 1 to 6.

As illustrated in FIG. 1, a camera module 10 according to an example may include a lens module 100, a first movable member 200, a second movable member 300, a first support member 380, a fixed member 400, a second support member 480, a first driving unit 500, and a second driving unit 600. However, the configuration of the camera module 10 is not limited to these members. For example, the camera module 10 may further include a first substrate 710, a second substrate 720, an image sensor 730, a housing 800, a shield can 900, and the like.

The lens module 100 may comprise a lens 110, a lens barrel 120, and a barrel holder 130. However, the configuration of the lens module 100 is not limited to the aforementioned members. For example, the lens barrel 120 and the barrel holder 130 may be integrally formed, or the barrel holder 130 may be omitted from the configuration of the lens module 100. The lens module 100 may include one or more lenses 110. For example, the lens module 100 may include five or more lenses 110. However, the configuration of the lens module 100 is not limited to the five lenses 110. For example, the lens module 100 may include 4 or fewer lenses 110 or 6 or more lenses 110. The lens barrel 120 may be configured to align the plurality of lenses 110 in an optical axis (C) direction. For example, the lens barrel 120 may align optical axes C of the lenses 110 through contact coupling with the lenses 110. The barrel holder 130 is configured to receive the lens barrel 120. The barrel holder 130 may be formed to facilitate coupling between the lens module 100 and other members. For example, the barrel holder 130 may be formed in a shape of a faceted body facilitating contact coupling with other members.

The first movable member 200 is configured to be coupled to the lens module 100. For example, the first movable member 200 may be coupled to the barrel holder 130 of the lens module 100. The first movable member 200 may be configured to enable rotational driving. For example, the first movable member 200 may be configured to rotate around a virtual first axis P1 intersecting the optical axis C in a state in which the first movable member 200 is coupled to the lens module 100. The first movable member 200 may be formed to be coupled to some components of the first driving unit 500. For example, on one side of the first movable member 200, a first receiving portion 210 in which a first driving magnet 510 of the first driving unit 500 may be disposed may be formed. The first receiving portion 210 may be configured to accommodate the first driving magnet 510. For example, the internal space of the first receiving portion 210 may be formed to have a size and shape substantially the same as the size of the first driving magnet 510.

The second movable member 300 may be disposed between the first movable member 200 and the fixed member 400. For example, the second movable member 300 may be located above the fixed member 400 while being located below the first movable member 200. The second movable member 300 may support the first movable member 200 to enable rotation of the first movable member 200. For example, the second movable member 300 may support the first movable member 200 through the first support member 380 to enable rotation of the first movable member 200. The second movable member 300 may be coupled to the first support member 380. For example, a coupling groove into which the first support member 380 is to be inserted may be formed in one surface of the second movable member 300.

The second movable member 300 may be configured to enable rotational driving. For example, the second movable member 300 may be configured to rotate around a virtual second axis P2 intersecting the optical axis C. For reference, the second axis P2 may be formed in a direction intersecting the first axis P1. In addition, the second movable member 300 may be formed to be coupled to some components of the second driving unit 600. For example, on one side of the second movable member 300, a second receiving portion 310 may be formed on which a second driving magnet 610 of the second driving unit 600 may be disposed. The second receiving portion 310 may be configured to accommodate the second driving magnet 610. For example, the inner space of the second receiving portion 310 may be formed to have substantially the same size and shape as the size of the second driving magnet 610.

The first support member 380 is disposed between the first movable member 200 and the second movable member 300. As described above, the first support member 380 may support the first movable member 200 to enable rotation of the first movable member 200. In addition, the first support member 380 may be formed to have a predetermined height. For example, the first support member 380 may be formed to have a predetermined height in the direction of the optical axis (C), such that the first movable member 200 and the second movable member 300 may be disposed to have a predetermined interval therebetween.

The first support member 380 may be coupled to the first movable member 200 and the second movable member 300. For example, one end of the first support member 380 may contact with or be coupled to the first movable member 200, and the other end thereof may be coupled to the second movable member 300. The first support member 380 may be formed at intervals in one direction. For example, the first support member 380 may be formed in the short axis direction or the width direction of the second movable member 300. Alternatively, the first support member 380 may be formed in the short axis direction or the width direction of the fixed member 400.

The first support member 380 may be configured to smoothly rotate the first movable member 200. For example, one end of the first support member 380 may be formed to have a substantially curved surface to be in line contact with a fitting groove of the first movable member 200 or in rolling contact therewith. A contact point or a coupling point between the first support member 380 and the first movable member 200 may be located substantially on the virtual first axis P1. Accordingly, the first movable member 200 may be rotated around the contact point with the first support member 380. As another example, the first support member 380 may enable rotation of the first movable member 200 through elastic deformation. For example, the first support member 380 may be formed of a material easily elastically deformed by an external force or provided with a groove 382 formed as illustrated in FIG. 1 to facilitate bending deformation by an external force.

The fixed member 400 is disposed below the second movable member 300 and is configured to support the second movable member 300. For example, the fixed member 400 may support the second movable member 300 to enable rotation of the second movable member 300 via the second support member 480. The fixed member 400 may be configured to be coupled to the housing 800. For example, the fixed member 400 may be fixed to an inner side of the housing 800 not to move.

The second support member 480 is disposed between the second movable member 300 and the fixed member 400. The second support member 480 may support the second movable member 300 to enable rotation of the second movable member 300 as described above. The second support member 480 may be formed to have a predetermined height. For example, the second support member 480 may be formed to have a predetermined height in the direction of the optical axis C so that the second movable member 300 and the fixed member 400 may be disposed at a predetermined interval.

The second support member 480 may be coupled to the second movable member 300 and the fixed member 400. For example, one end of the second support member 480 may contact or be coupled to the second movable member 300, and the other end thereof may be coupled to the fixed member 400. The second support member 480 may be formed at intervals in one direction. For example, the second support member 480 may be formed in the short axis direction or the width direction of the fixed member 400.

The second support member 480 may be formed to rotate the second movable member 300 smoothly. For example, one end of the second support member 480 may be formed to have a substantially curved surface and may be in line contact or rolling contact with a fitting groove of the second movable member 300. A contact point or a coupling point between the second support member 480 and the fixed member 400 may be substantially located on the virtual second axis P2. Accordingly, the second movable member 300 may be rotated around a contact point with the second support member 480. As another example, the second support member 480 may enable rotation of the second movable member 300 through elastic deformation. For example, the second support member 480 may be formed of a material easily elastically deformed by an external force, or is provided with the groove 482 as illustrated in FIG. 1 to facilitate bending deformation by an external force.

The first movable member 200, the second movable member 300, and the fixed member 400 may be sequentially disposed in the optical axis C direction. For example, the second movable member 300 may be disposed below the first movable member 200, and the fixed member 400 may be disposed below the second movable member 300. The first movable member 200, the second movable member 300, and the fixed member 400 may be disposed at a predetermined interval. For example, the first movable member 200 and the second movable member 300 are disposed at a first interval to enable rotation of the first movable member 200, and the second movable member 300 and the fixed member 400 may be disposed at a second interval to enable rotation of the second movable member 300. The first interval and the second interval may have the same size. However, the first interval and the second interval are not necessarily formed to have the same size. The first movable member 200, the second movable member 300, and the fixed member 400 may have substantially the same size and shape. For example, the first movable member 200, the second movable member 300, and the fixed member 400 may be formed in a substantially quadrangular frame shape. However, the shape of the first movable member 200, the second movable member 300, and the fixed member 400 is not limited to the quadrangular shape.

The first driving unit 500 may provide driving force required for rotational driving of the first movable member 200. For example, the first driving unit 500 may provide driving force to one side of the first movable member 200 to enable rotational driving of the first movable member 200. The first driving unit 500 may include the first driving magnet 510 and a first driving coil 520. The first driving magnet 510 may be disposed on the first movable member 200, and the first driving coil 520 may be disposed on the housing 800 or the first substrate 710. The first driving magnet 510 and the first driving coil 520 may be disposed to face each other. For example, the first driving coil 520 may be disposed on one side of the housing 800 to be closest to the first driving magnet 510 and to face the first driving magnet 510.

The second driving unit 600 may provide the driving force required for rotational driving of the second movable member 300. For example, the second driving unit 600 may provide driving force to one side of the second movable member 300 to enable rotation of the second movable member 300. The second driving unit 600 may include a second driving magnet 610 and a second driving coil 620. The second driving magnet 610 may be disposed on the second movable member 300, and the second driving coil 620 may be disposed on the housing 800 or the first substrate 710. The second driving magnet 610 and the second driving coil 620 may be disposed to face each other. For example, the second driving coil 620 may be disposed on one side of the housing 800 to be closest to the second driving magnet 610 and to face the second driving magnet 610.

The first driving unit 500 and the second driving unit 600 may be disposed to generate driving force in directions intersecting each other. For example, the first driving unit 500 may be disposed near the first side of the lens module 100, and the second driving unit 600 may be disposed near the second side of the lens module 100. As another example, the first driving magnet 510 and the first driving coil 520 of the first driving unit 500 are disposed substantially parallel to the first axis P1, and the second driving magnet 610 and the second driving coil 620 of the second driving unit 600 may be disposed substantially parallel to the second axis P2. Accordingly, the first driving unit 500 and the second driving unit 600 may rotate the lens module 100 in different directions to perform image stabilization.

The first substrate 710 may be connected to the first driving unit 500 and the second driving unit 600. For example, the first substrate 710 may be electrically connected to the first driving coil 520 of the first driving unit 500 and the second driving coil 620 of the second driving unit 600. The first substrate 710 may enable control of the first driving unit 500 and the second driving unit 600. For example, the first substrate 710 is electrically connected to the second substrate 720 provided with the control device thereon, and may transmit a control signal of the second substrate 720 to the first driving unit 500 and the second driving unit 600. The first substrate 710 may be configured to be bent and deformed. For example, the first substrate 710 may be formed of a flexible material. The first substrate 710 may be disposed on the housing 800. For example, the first substrate 710 may be disposed in the housing 800 so that the first driving coil 520 and the second driving coil 620 may be disposed in openings 802 and 804 of the housing 800.

The second substrate 720 may be disposed on one side of the housing 800. For example, the second substrate 720 may be disposed below the housing 800. The second substrate 720 may include the image sensor 730 converting an optical signal into an electrical signal. In addition, the second substrate 720 may further include a passive element required for driving the image sensor 730 and the like. The second substrate 720 may be electrically connected to the first substrate 710. For example, the second substrate 720 may be electrically connected to the first substrate 710 through a separate member. A connector 740 connecting the camera module 10 and an electronic device (e.g., a portable terminal) may be disposed on the second substrate 720.

The housing 800 may be configured to accommodate the lens module 100, the first movable member 200, the second movable member 300, the fixed member 400, the first driving unit 500, and the second driving unit 600. For example, the housing 800 may be formed in a polyhedron shape having an accommodation space to accommodate the aforementioned members. However, the shape of the housing 800 is not limited to a polyhedron. The housing 800 may be formed to allow the first driving unit 500 and the second driving unit 600 to be disposed. For example, the openings 802 and 804 may be formed in two different sides of the housing 800, such that the first driving coil 520 and the second driving coil 620 face the first driving magnet 510 and the second driving magnet 610.

The shield can 900 may be configured to protect major components of the camera module 10 from harmful electromagnetic waves or external shocks. For example, the shield can 900 is configured to surround the exterior of the housing 800. Thus, malfunction of the first driving unit 500 and the second driving unit 600 due to harmful electromagnetic waves may be prevented. In addition, the shield can 900 may reduce damage to the lens module 100, the first movable member 200, the second movable member 300, the fixed member 400, the first driving unit 500, the second driving unit 600, and the housing 800 due to external impacts.

The camera module 10 configured as described above has a thin structure as illustrated in FIG. 2 and thus may be easily mounted on a portable terminal.

Next, according to an example, an operating state of a camera module will be described with reference to FIGS. 3 to 6.

The camera module 10, according to an example, may perform image stabilization through a rotational motion or a trajectory motion of the lens module 100.

Figure 3:
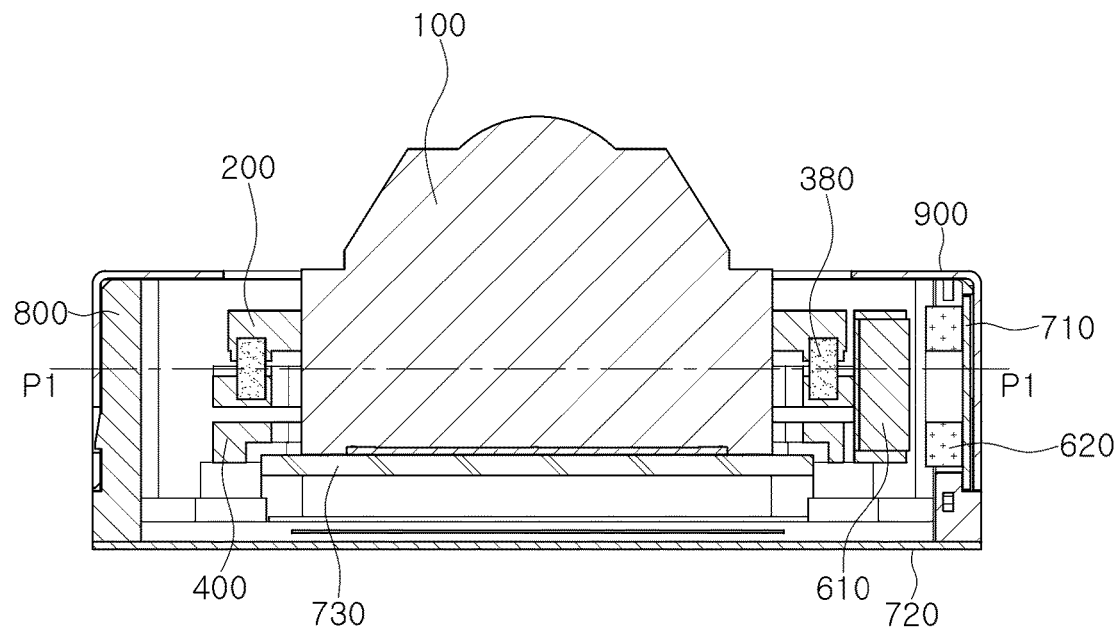
FIGS. 3 to 6 are cross-sectional perspective views and partially cut-away perspective views of the camera module illustrated in FIG. 2.
Figure 4:
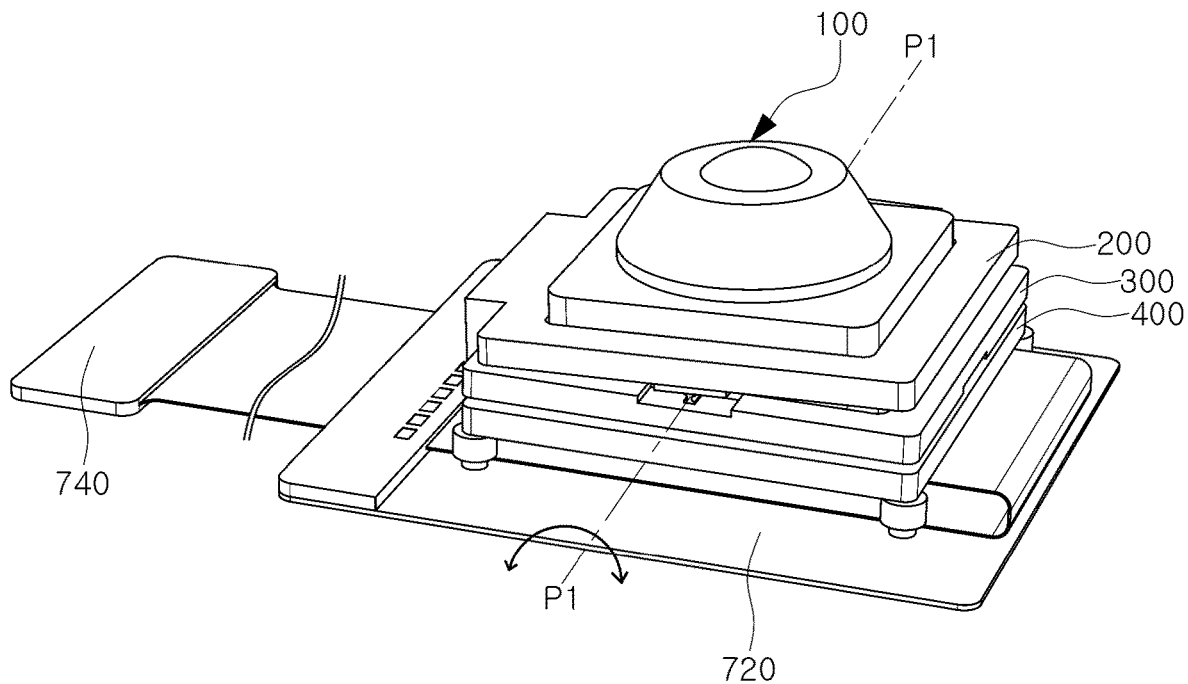

As an example, the camera module 10 may correct shaking acting in the direction of the second axis P2 by rotating the lens module 100 and the first movable member 200 about the virtual first axis P1 as illustrated in FIGS. 3 and 4.

The rotational driving of the lens module 100 and the first movable member 200 may be performed by the first driving unit 500. For example, when shaking in the direction of the second axis P2 is detected, the control device of the camera module 10 may drive the first driving unit 500 to rotate the lens module 100 and the first movable member 200.

The first driving unit 500 may rotate the lens module 100 and the first movable member 200 around the virtual first axis P1. For example, the first movable member 200 may be rotated clockwise or counterclockwise due to an interaction between the first driving magnet 510 and the first driving coil 520. The first movable member 200 may be rotated around a coupling point between the first movable member 200 and the first support member 380 or about the groove 382 of the first support member 380. The coupling point between the first movable member 200 and the first support member 380 or the groove 382 described above may be formed substantially on the first axis P1. The lens module 100 moves integrally with the first movable member 200. It may thus rotate in the same direction together with the first movable member 200 when the first movable member 200 is driven.

Figure 5:
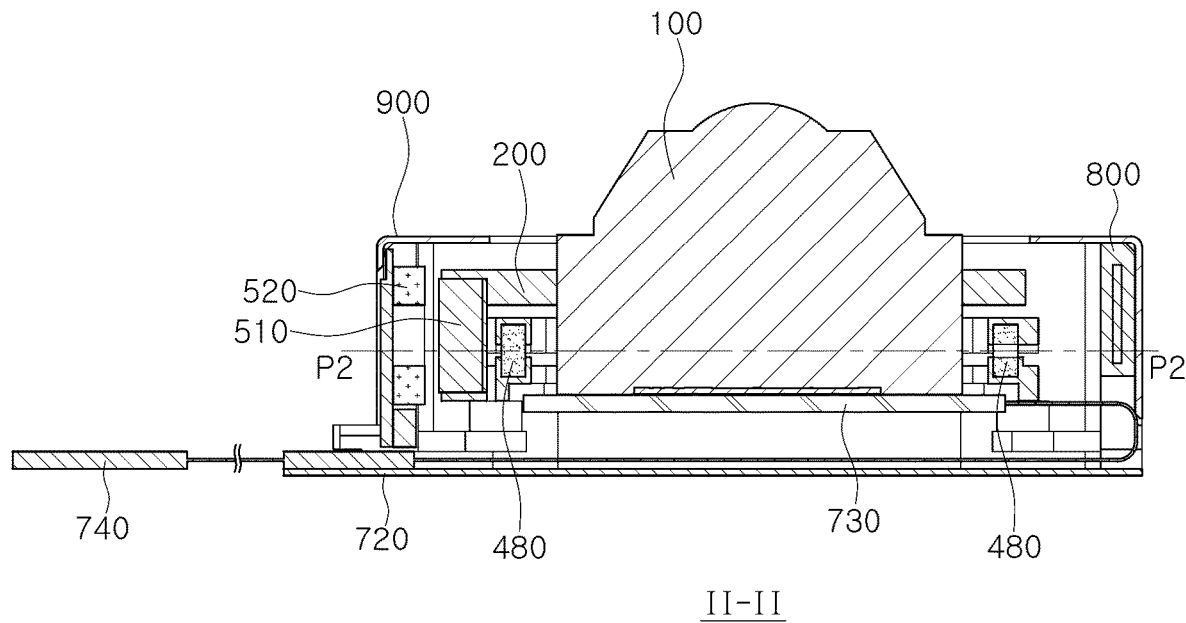
Figure 6:
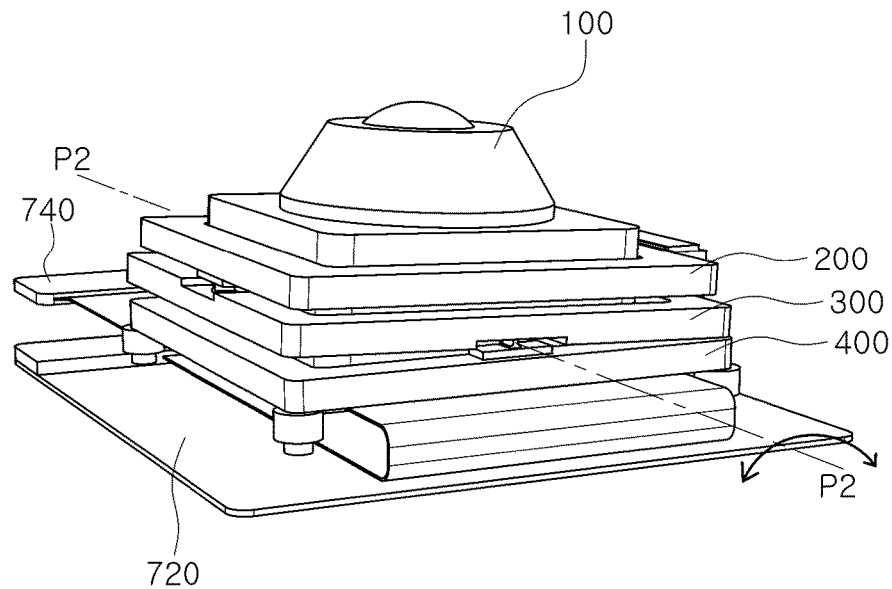

As another example, the camera module 10 may correct shaking acting in the direction of the first axis P1 by rotating the lens module 100 and the movable members 200 and 300 about the virtual second axis P2 as illustrated in FIGS. 5 and 6.

The rotational driving of the lens module 100 and the movable members 200 and 300 may be performed by the second driving unit 600. For example, when shaking in the direction of the first axis P1 is detected, the control device of the camera module 10 may rotate the second movable member 300 by driving the second driving unit 600.

The second driving unit 600 may rotate the second movable member 300 around the virtual second axis P2. For example, the second movable member 300 may be rotated clockwise or counterclockwise due to an interaction between the second driving magnet 610 and the second driving coil 620. The second movable member 300 may be rotated around a coupling point between the second movable member 300 and the second support member 480 or the groove 482 of the second support member 480. The coupling point between the second movable member 300 and the second support member 480 or the groove 482 as described above may be formed substantially on the second axis P2. The lens module 100 and the first movable member 200 are disposed on the second movable member 300, and may thus be rotated in the same direction as the second movable member 300 when the second movable member 300 is rotated.

As another example, the camera module 10 rotates the lens module 100 at the same time around the virtual first axis P1 and second axis P2 to correct shaking in the direction of the first axis P1 and the second axis P2. In detail, the lens module 100 may be rotated about the first axis P1 and the second axis P2 by the movement of the first movable member 200 rotated by the first driving unit 500 and the movement of the second movable member 300 rotated by the second driving unit 600. For example, the lens module 100 may be rotated around the first axis P1 by the first driving unit 500, and simultaneously be rotated around the second axis P2 by the second driving unit 600. As another example, the lens module 100 is rotated around the first axis P1 by the first driving unit 500, and then rotated around the second axis P2 by the second driving unit 600. The amount of rotation of the lens module 100 by the first driving unit 500 and the second driving unit 600 may be increased or decreased in proportion to the amount of shaking applied to the camera module 10.

The camera module 10 configured as above performs image stabilization as the lens module 100 rotates around the virtual first axis P1 and the second axis P2, thereby suppressing a phenomenon of collision between the lens module 100 and the housing and reducing collision sound.

A camera module, according to another example, will be described with reference to FIGS. 7 to 12.

Figure 7:
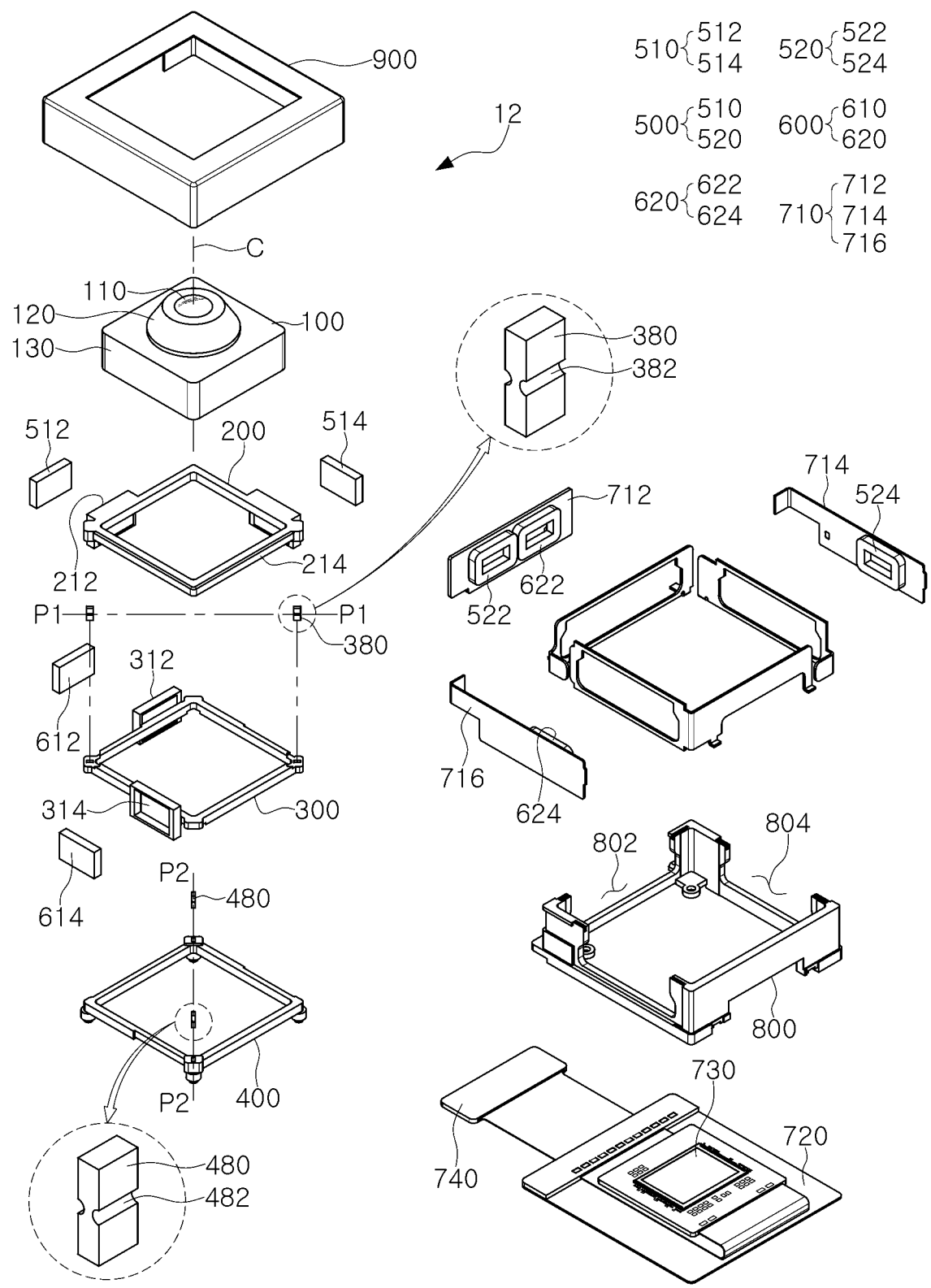
FIG. 7 is an exploded perspective view of a camera module, according to another example.

First, the configuration of a camera module 12 will be described with reference to FIG. 7.

The camera module 12, according to an example, may include a lens module 100, a first movable member 200, a second movable member 300, a first support member 380, a fixed member 400, a second support member 480, a first driving unit 500 and a second driving unit 600. However, the configuration of the camera module 12 is not limited to these members. For example, the camera module 12 may further include a first substrate 710, a second substrate 720, an image sensor 730, a housing 800, a shield can 900, and the like.

The lens module 100 may comprise a lens 110, a lens barrel 120, and a barrel holder 130. However, the configuration of the lens module 100 is not limited to the aforementioned members. For example, the lens barrel 120 and the barrel holder 130 may be integrally formed, or the barrel holder 130 may be omitted from the configuration of the lens module 100. The lens module 100 may include one or more lenses 110. For example, the lens module 100 may include five or more lenses 110. However, the configuration of the lens module 100 is not limited to the five lenses 110. For example, the lens module 100 may include 4 or less lenses 110 or 6 or more lenses 110. The lens barrel 120 may be configured to align the plurality of lenses 110 in the optical axis (C) direction. For example, the lens barrel 120 may align the optical axes C of the lenses 110 through contact coupling with the lenses 110. The barrel holder 130 is configured to receive the lens barrel 120. The barrel holder 130 may be formed to facilitate coupling between the lens module 100 and other members. For example, the barrel holder 130 may be formed to have a shape of a faceted body facilitating contact coupling with other members.

The first movable member 200 is configured to be coupled to the lens module 100. For example, the first movable member 200 may be coupled to the barrel holder 130 of the lens module 100. The first movable member 200 may be configured to enable rotational driving. For example, the first movable member 200 may be configured to rotate around a virtual first axis P1 intersecting the optical axis C in a state in which the first movable member 200 is coupled to the lens module 100. The first movable member 200 may be formed to be coupled to some components of the first driving unit 500. For example, first receiving portions 210 (212, 214) in which first driving magnets 510 (512, 514) of the first driving unit 500 may be disposed may be formed on a first side and a second side of the first movable member 200. The first receiving portions 210 (212, 214) may be configured to accommodate the first driving magnets 510 (512, 514). For example, the internal space of the first receiving portion 210 (212, 214) may be formed to have substantially the same size and shape as the size of the first driving magnet 510 (512, 514).

The second movable member 300 may be disposed between the first movable member 200 and the fixed member 400. For example, the second movable member 300 may be located above the fixed member 400 while being located below the first movable member 200. The second movable member 300 may support the first movable member 200 to enable rotation of the first movable member 200. For example, the second movable member 300 may support the first movable member 200 to enable rotation of the first movable member 200 through the first support member 380. The second movable member 300 may be coupled to the first support member 380. For example, a coupling groove into which the first support member 380 is fitted may be formed in one surface of the second movable member 300.

The second movable member 300 may be configured to enable rotational driving. For example, the second movable member 300 may be configured to rotate around a virtual second axis P2 intersecting the optical axis C. For reference, the second axis P2 may be formed in a direction intersecting the first axis P1. The second movable member 300 may be formed to be coupled to some components of the second driving unit 600. For example, on a first side and a second side of the second movable member 300, a second receiving portion 310 (312, 314) in which second driving magnets 610 (612, 614) of the second driving unit 600 may be disposed may be formed. The second receiving portion 310 (312, 314) may be configured to accommodate the second driving magnet 610 (612, 614). For example, the inner space of the second receiving portion 310 (312, 314) may be formed to have substantially the same size and shape as the size of the second driving magnet 610 (612, 614). The second receiving portions 310 (312, 314) may be formed in positions that do not overlap the first receiving portions 210 (212, 214). For example, the second receiving portion 312 is formed side by side with the first accommodating part 212 to face the same side of the lens module 100. The second receiving portion 314 and the first receiving portion 214 may be formed to face different sides of the lens module 100.

The first support member 380 is disposed between the first movable member 200 and the second movable member 300. As described above, the first support member 380 may support the first movable member 200 to enable rotation of the first movable member 200. In addition, the first support member 380 may be formed to have a predetermined height. For example, the first support member 380 may be formed at a predetermined height in the direction of the optical axis (C) in such a manner that the first movable member 200 and the second movable member 300 may be disposed at a predetermined interval.

The first support member 380 may be coupled to the first movable member 200 and the second movable member 300. For example, one end of the first support member 380 may contact or be coupled to the first movable member 200, and the other end thereof may be coupled to the second movable member 300. In addition, the first support member 380 may be formed at intervals in one direction. For example, the first support member 380 may be formed in a long axis direction or a diagonal direction of the second movable member 300. Alternatively, the first support member 380 may be formed in a long axis direction or a diagonal direction of the fixed member 400.

The first support member 380 may be formed to smoothly rotate the first movable member 200. For example, one end of the first support member 380 may be formed to have a substantially curved surface to be in line contact or in rolling contact with the fitting groove of the first movable member 200. A contact point or a coupling point between the first support member 380 and the first movable member 200 may be located substantially on a virtual first axis P1. Accordingly, the first movable member 200 may be rotated around a contact point with the first support member 380. As another example, the first support member 380 may enable rotation of the first movable member 200 through elastic deformation. For example, the first support member 380 may be formed of a material easily elastically deformed by an external force or provided with a groove 382 formed as illustrated in FIG. 7 to facilitate bending deformation by an external force.

The fixed member 400 is disposed below the second movable member 300 and is configured to support the second movable member 300. For example, the fixed member 400 may support the second movable member 300 to enable rotation of the second movable member 300 via the second support member 480. In addition, the fixed member 400 may be configured to be coupled to the housing 800. For example, the fixed member 400 may be fixed to an inner side of the housing 800 not to move therein.

The second support member 480 is disposed between the second movable member 300 and the fixed member 400. The second support member 480 may support the second movable member 300 to enable rotation of the second movable member 300 as described above. The second support member 480 may be formed to have a predetermined height. For example, the second support member 480 may be formed at a predetermined height in the direction of the optical axis C so that the second movable member 300 and the fixed member 400 may be disposed at a predetermined interval.

The second support member 480 may be coupled to the second movable member 300 and the fixed member 400. For example, one end of the second support member 480 may contact or be coupled to the second movable member 300, and the other end thereof may be coupled to the fixed member 400. In addition, the second support member 480 may be formed at intervals in one direction. For example, the second support member 480 may be formed in a long axis direction or a diagonal direction of the fixed member 400.

The second support member 480 may be formed so that rotational driving of the second movable member 300 is smoothly performed. For example, one end of the second support member 480 may be formed to have a substantially curved surface to be in line contact or rolling contact with the fitting groove of the second movable member 300. A contact point or a coupling point between the second support member 480 and the fixed member 400 may be substantially located on the virtual second axis P2. Accordingly, the second movable member 300 may be rotated around a contact point with the second support member 480. As another example, the second support member 480 may enable rotation of the second movable member 300 through elastic deformation. For example, the second support member 480 may be formed of a material easily elastically deformed by an external force or provided with a groove 482 to facilitate bending deformation by an external force.

The first movable member 200, the second movable member 300, and the fixed member 400 may be sequentially disposed in the optical axis C direction. For example, the second movable member 300 may be disposed below the first movable member 200, and the fixed member 400 may be disposed below the second movable member 300. The first movable member 200, the second movable member 300, and the fixed member 400 may be disposed at predetermined intervals. For example, the first movable member 200 and the second movable member 300 are disposed at a first interval to enable rotation of the first movable member 200, and the second movable member 300 and the fixed member 400 may be disposed at a second interval to enable rotation of the second movable member 300. The first interval and the second interval may have the same size. However, the first interval and the second interval do not necessarily have the same size. The first movable member 200, the second movable member 300, and the fixed member 400 may be formed to have substantially the same size and shape. For example, the first movable member 200, the second movable member 300, and the fixed member 400 may be formed to have a substantially quadrangular frame shape. However, the shape of the first movable member 200, the second movable member 300, and the fixed member 400 is not limited to the quadrangular shape.

The first driving unit 500 may provide driving force required for rotational driving of the first movable member 200. For example, the first driving unit 500 may provide driving force to one side of the first movable member 200 to enable rotational driving of the first movable member 200. The first driving unit 500 may include first driving magnets 510 (512, 514) and first driving coils 520 (522, 524). The first driving magnets 510 (512, 514) may be disposed on the first movable member 200, and the first driving coils 520 (522, 524) may be disposed on the housing 800 or the first substrate 710. The first driving magnets 510 (512, 514) and the first driving coils 520 (522, 524) may be disposed to face each other. For example, the first driving coils 520 (522, 524) may be disposed in a first opening 802 and a second opening 804 of the housing 800, to be closest to the first driving magnets 510 (512, 514) and to face the first driving magnets 510 (512, 514).

The second driving unit 600 may provide the driving force required for rotational driving of the second movable member 300. For example, the second driving unit 600 may provide driving force to one side of the second movable member 300 to enable rotation of the second movable member 300. The second driving unit 600 may include second driving magnets 610 (612, 614) and second driving coils 620 (622, 624). The second driving magnets 610 (612, 614) may be disposed on the second movable member 300, and the second driving coil 620 may be disposed on the housing 800 or the first substrate 710. In addition, the second driving magnets 610 (612, 614) and the second driving coils 620 (622, 624) may be disposed to face each other. For example, the second driving coils 620 (622, 624) may be disposed in the first opening 802 and a third opening 806, to be closest to the second driving magnets 610 (612, 614) and to face the second driving magnets 610 (612, 614).

The first driving unit 500 and the second driving unit 600 may be disposed to generate driving force in directions intersecting each other. For example, the first driving unit 500 may be disposed adjacent to the first side and the second side of the lens module 100, and the second driving unit 600 may be disposed adjacent to the first side and the third side of the lens module 100. As another example, the first driving magnet 510 and the first driving coil 520 of the first driving unit 500 may be disposed on one side of the first axis P1, and the driving magnet 610 and the second driving coil 620 of the second driving unit 600 may be disposed on one side of the second axis P2. Accordingly, the first driving unit 500 and the second driving unit 600 may rotate the lens module 100 in different directions to perform image stabilization of the camera module.

Portions of the first driving unit 500 and the second driving unit 600 may be disposed to provide a driving force to the same side of the lens module 100. For example, the first driving magnet 512 of the first driving unit 500 and the second driving magnet 612 of the second driving unit 600 may be disposed to face the same side respectively, for example, the first side of the lens module 100, and the first driving coil 522 of the first driving unit 500 and the second driving coil 622 of the second driving unit 600 interact with the driving magnets 512 and 612 to provide a driving force to the first side of the lens module 100.

The first substrate 710 may be connected to the first driving unit 500 and the second driving unit 600. For example, the first substrate 710 may be electrically connected to the first driving coil 520 of the first driving unit 500 and the second driving coil 620 of the second driving unit 600. The first substrate 710 may enable control of the first driving unit 500 and the second driving unit 600. For example, the first substrate 710 is electrically connected to the second substrate 720 provided with a control device, and may transmit a control signal of the second substrate 720 to the first driving unit 500 and the second driving unit 600. The first substrate 710 may be configured to be bent and deformed. For example, the first substrate 710 may be formed of a flexible material. The first substrate 710 may be disposed on the housing 800. For example, the first substrate 710 may be disposed on the housing 800 so that the first driving coil 520 and the second driving coil 620 may be disposed in the openings 802, 804, 806 of the housing 800.

The second substrate 720 may be disposed on one side of the housing 800. For example, the second substrate 720 may be disposed below the housing 800. The second substrate 720 may include an image sensor 730 converting an optical signal into an electrical signal. In addition, the second substrate 720 may further include a passive element required for driving the image sensor 730, and the like. The second substrate 720 may be electrically connected to the first substrate 710. For example, the second substrate 720 may be electrically connected to the first substrate 710 through a separate member. A connector 740 connecting the camera module 12 and an electronic device, e.g., a portable terminal, may be disposed on the second substrate 720.

The housing 800 may be configured to accommodate the lens module 100, the first movable member 200, the second movable member 300, the fixed member 400, the first driving unit 500, and the second driving unit 600. For example, the housing 800 may be formed to have a polyhedron shape having an accommodation space to accommodate the aforementioned members. However, the shape of the housing 800 is not limited to a polyhedron. The housing 800 may be formed to allow the first driving unit 500 and the second driving unit 600 to be disposed. For example, the openings 802, 804, and 806 may be formed in two different side surfaces of the housing 800 in such a manner that the first driving coil 520 and the second driving coil 620 may be disposed to face the first driving magnet 510 and the second driving magnet 610.

The shield can 900 may be configured to protect the main components of the camera module 12 from harmful electromagnetic waves or external shocks. For example, the shield can 900 may be configured to surround the exterior of the housing 800 to prevent malfunction of the first driving unit 500 and the second driving unit 600 due to harmful electromagnetic waves. In addition, the shield can 900 may reduce damage to the lens module 100, the first movable member 200, the second movable member 300, the fixed member 400, the first driving unit 500, the second driving unit 600, and the housing 800.

Figure 8:
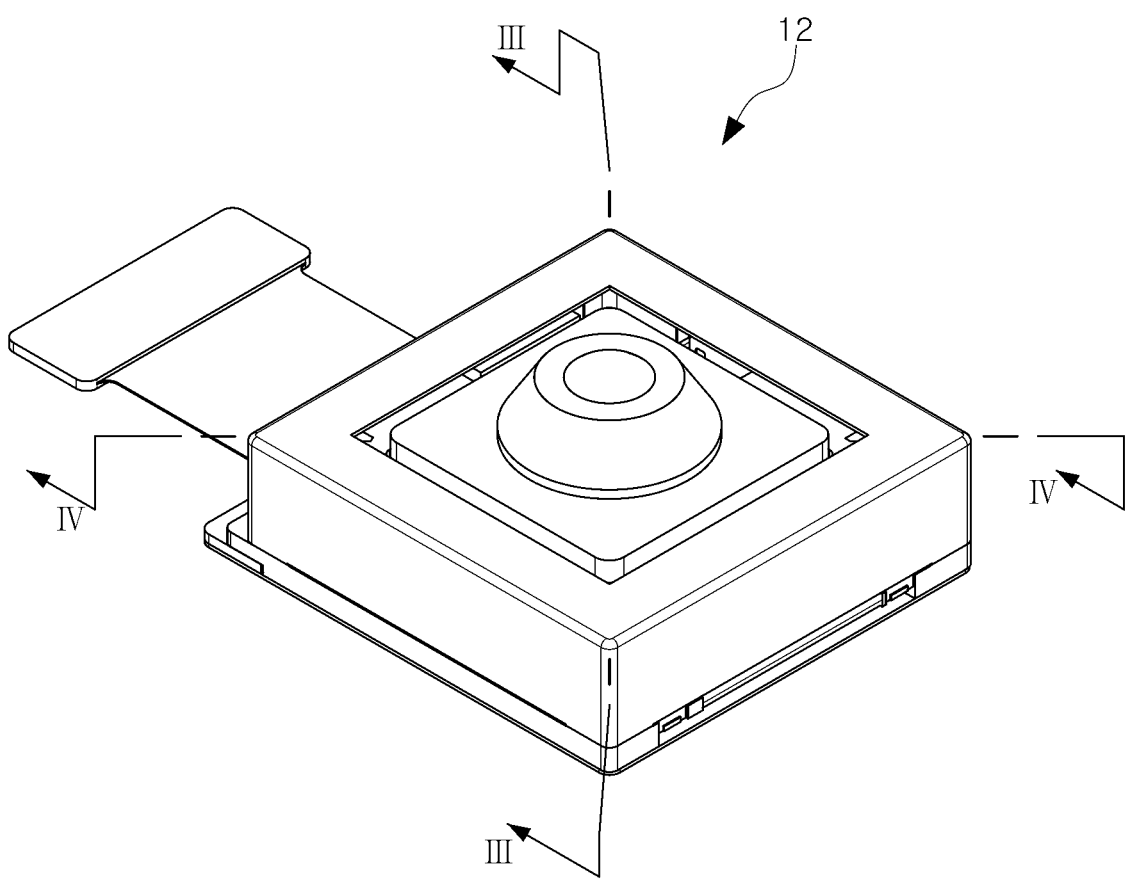
FIG. 8 is a perspective view of the camera module illustrated in FIG. 7.

The camera module 12 configured as described above has a thin structure, as illustrated in FIG. 8, and thus may be easily mounted on a portable terminal.

Next, according to an example, an operating state of the camera module will be described with reference to FIGS. 9 to 12.

The camera module 12, according to an example, may perform image stabilization through a rotational motion or a trajectory motion of the lens module 100.

Figure 9:
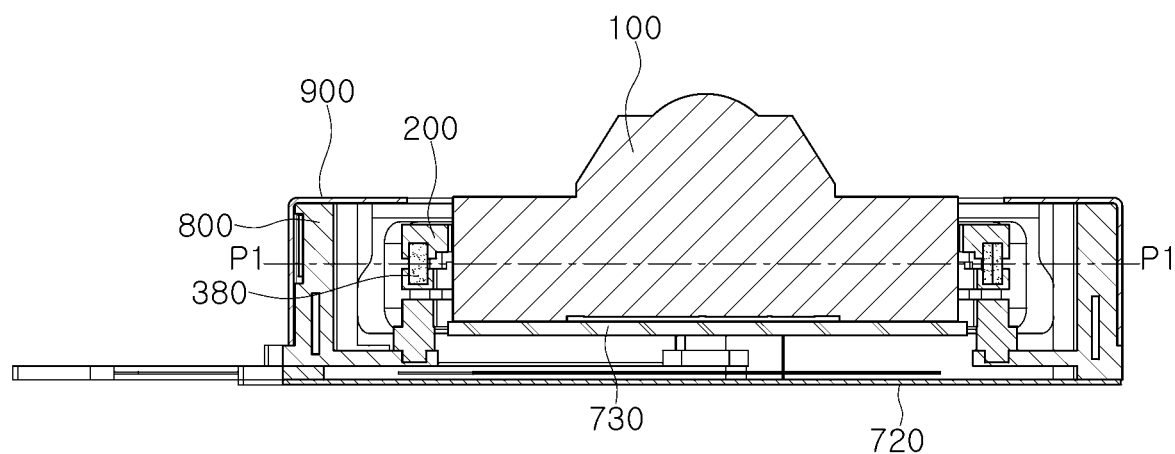
FIGS. 9 to 12 are cross-sectional perspective views and partially cut-away perspective views of the camera module illustrated in FIG. 8.
Figure 10:
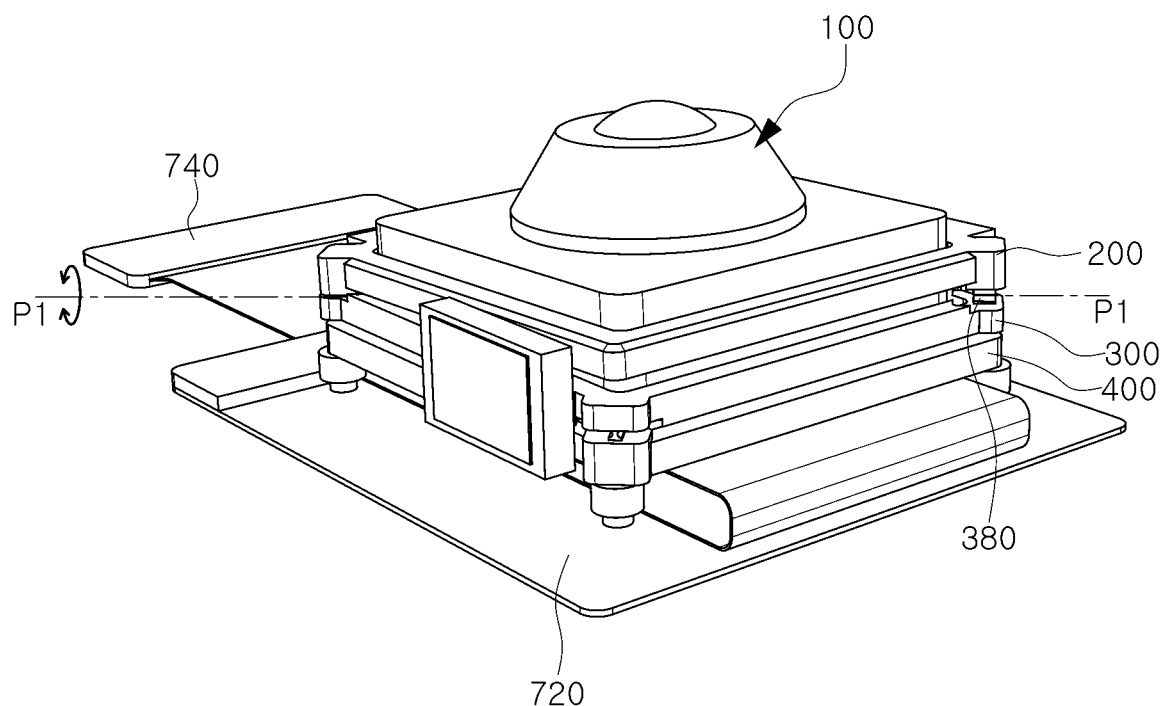

As an example, the camera module 12 is configured to rotate the lens module 100 and the first movable member 200 around a virtual first axis P1, as illustrated in FIGS. 9 and 10, thereby correcting shaking acting in the direction of the second axis P2.

The rotational driving of the lens module 100 and the first movable member 200 may be performed by the first driving unit 500. For example, when shaking in the direction of the second axis P2 is detected, the control device of the camera module 12 drives the first driving unit 500 to rotate the lens module 100 and the first movable member 200.

The first driving unit 500 may rotate the lens module 100 and the first movable member 200 around the virtual first axis P1. For example, the first movable member 200 may be rotated clockwise or counterclockwise due to an interaction between the first driving magnet 510 and the first driving coil 520. The first movable member 200 may be rotated around a coupling point between the first movable member 200 and the first support member 380 or the groove 382 of the first support member 380. The coupling point between the first movable member 200 and the first support member 380 or the groove 382 described above may be formed substantially on the first axis P1. The lens module 100 moves integrally with the first movable member 200 and thus rotates in the same direction with the first movable member 200 when the first movable member 200 is driven.

Figure 11:
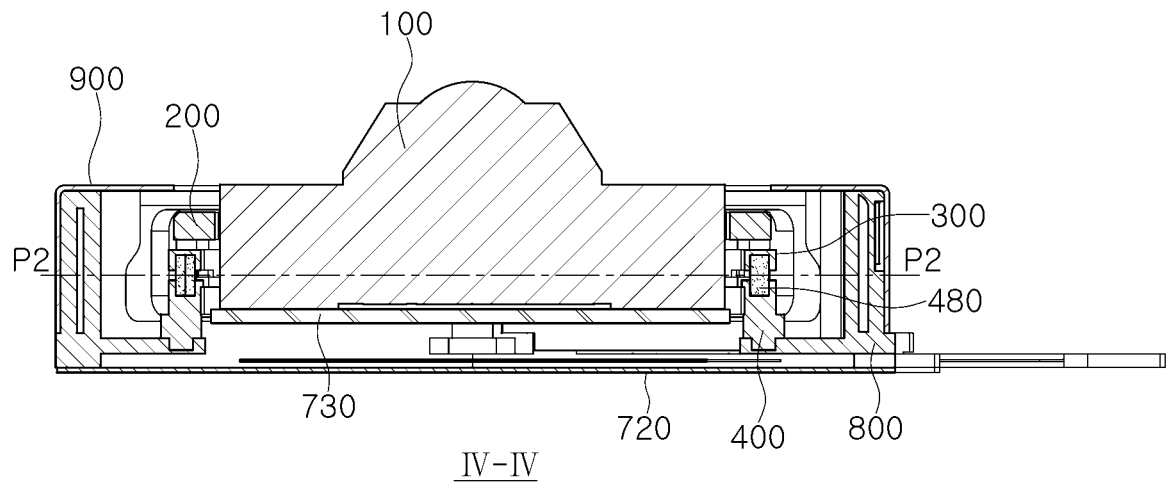
Figure 12:
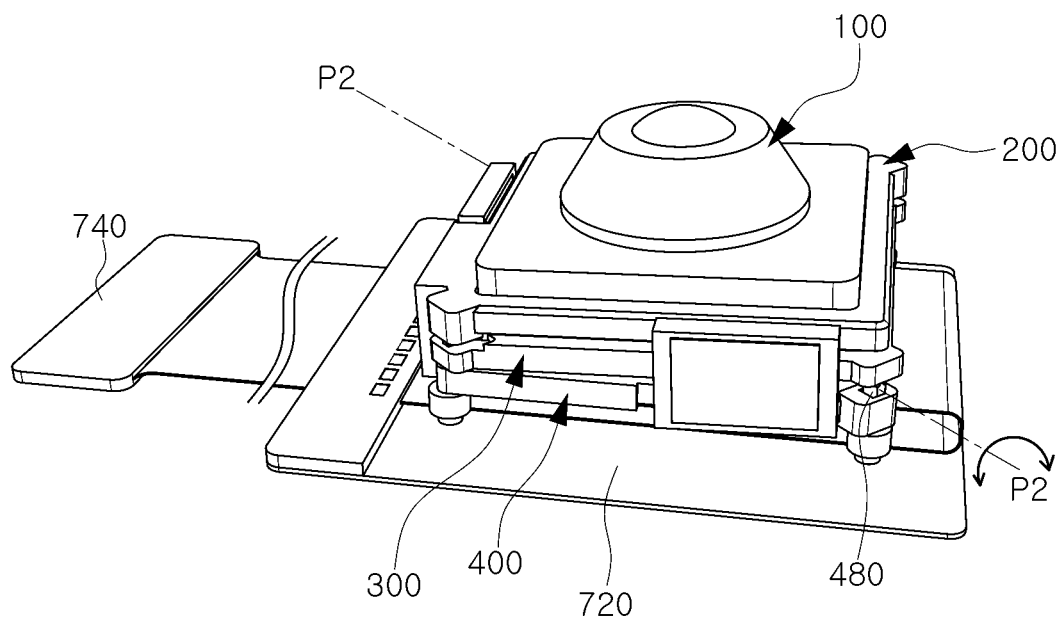

As another example, the camera module 12 may be configured to rotate the lens module 100 and the movable members 200 and 300 around a virtual second axis P2 as illustrated in FIGS. 11 and 12, and may correct shaking acting in the direction of the first axis P1.

Rotational driving of the lens module 100 and the movable members 200 and 300 may be performed by the second driving unit 600. For example, when shaking in the direction of the first axis P1 is detected, the control device of the camera module 12 may rotate the second movable member 300 by driving the second driving unit 600.

The second driving unit 600 may rotate the second movable member 300 around the virtual second axis P2. For example, the second movable member 300 may be rotated clockwise or counterclockwise due to an interaction between the second driving magnet 610 and the second driving coil 620. In addition, the second movable member 300 may be rotated around a coupling point between the second movable member 300 and the second support member 480 or the groove 482 of the second support member 480. The coupling point between the second movable member 300 and the second support member 480 or the groove 482 described above may be formed substantially on the second axis P2. The lens module 100 and the first movable member 200 are disposed on the second movable member 300, and may thus rotate in the same direction together with the second movable member 300.

As another example, the camera module 12 rotates the lens module 100 at the same time around virtual first axis P1 and second axis P2 to correct shaking in directions of the first axis P1 and the second axis P2. In detail, the lens module 100 may be rotated about the first axis P1 and the second axis P2 by the movement of the first movable member 200 rotated by the first driving unit 500 and the movement of the second movable member 300 rotated by the second driving unit 600. For example, the lens module 100 may be rotated around the first axis P1 by the first driving unit 500 and at the same time be rotated around the second axis P2 by the second driving unit 600. As another example, the lens module 100 may be rotated around the first axis P1 by the first driving unit 500, and then rotated around the second axis P2 by the second driving unit 600. The amount of rotation of the lens module 100 by the first driving unit 500 and the second driving unit 600 may be increased or decreased in proportion to the amount of shaking applied to the camera module 12.

The camera module 12 configured as above performs shake correction as the lens module 100 rotates around the virtual first axis P1 and second axis P2, thereby suppressing a phenomenon of collision between the lens module 100 and the housing and reducing collision sound. In addition, the camera module 12, according to this example, is configured such that the first driving unit 500 and the second driving unit 600 provide a driving force to a plurality of sides of the lens module 100, thereby quickly and exactly performing image stabilization.

According to another example, a camera module will be described with reference to FIGS. 13 to 16.

A camera module 14, according to an example, may include a lens module 100, a movable member 200, a first support member 380, a fixed member 400, a second support member 480, and a first driving unit 500, and a second driving unit 600. However, the configuration of the camera module 14 is not limited to these members. For example, the camera module 14 may further include a first substrate 710, a second substrate 720, an image sensor 730, a housing 800, a shield can 900, and the like.

The lens module 100 may comprise a lens 110, a lens barrel 120, and a barrel holder 130. However, the configuration of the lens module 100 is not limited to the aforementioned members. For example, the lens barrel 120 and the barrel holder 130 may be integrally formed, or the barrel holder 130 may be omitted from the configuration of the lens module 100. The lens module 100 may include one or more lenses 110. For example, the lens module 100 may include five or more lenses 110. However, the configuration of the lens module 100 is not limited to the five lenses 110. For example, the lens module 100 may include 4 or less lenses 110 or 6 or more lenses 110. The lens barrel 120 may be configured to align the plurality of lenses 110 in the optical axis (C) direction. For example, the lens barrel 120 may align the optical axes C of the lenses 110 through contact coupling with the lenses 110. The barrel holder 130 is configured to receive the lens barrel 120. The barrel holder 130 may be formed to facilitate coupling between the lens module 100 and other members. For example, the barrel holder 130 may be formed to have a shape of a faceted body facilitating contact coupling with other members.

The lens module 100 may be configured to enable rotational driving. For example, the lens module 100 may be configured to rotate around a virtual first axis P1 intersecting the optical axis C. The lens module 100 may be formed to be combined with some components of the first driving unit 500. For example, a first receiving portion 132, on which the first driving magnet 510 of the first driving unit 500 may be disposed, may be formed on one side of the lens module 100. The first receiving portion 132 may be configured to accommodate the first driving magnet 510. For example, the inner space of the first receiving portion 132 may be formed to have substantially the same size and shape as the size of the first driving magnet 510.

The movable member 300 may be disposed between the lens module 100 and the fixed member 400. The movable member 300 may support the lens module 100 to enable rotational driving of the lens module 100. For example, the movable member 300 may support the lens module 100 rotated through the first support member 380. In addition, the movable member 300 may be coupled to the first support member 380. For example, a coupling groove into which the first support member 380 is fitted may be formed in one surface of the movable member 300.

The movable member 300 may be configured to enable rotational driving. For example, the movable member 300 may be configured to rotate around a virtual second axis P2 intersecting the optical axis C. For reference, the second axis P2 may be formed in a direction intersecting the first axis P1. In addition, the movable member 300 may be formed to be coupled to some components of the second driving unit 600. For example, on one side of the movable member 300, a second receiving portion 310 may be formed on which the second driving magnet 610 of the second driving unit 600 may be disposed. The second receiving portion 310 may be configured to accommodate the second driving magnet 610. For example, the inner space of the second receiving portion 310 may be formed to have substantially the same size and shape as the size of the second driving magnet 610.

The first support member 380 is disposed between the lens module 100 and the second movable member 300. As described above, the first support member 380 may support the lens module 100 to enable rotation of the lens module 100. In addition, the first support member 380 may be formed to have a predetermined height. For example, the first support member 380 may be formed at a predetermined height in the direction of the optical axis C so that the lens module 100 and the second movable member 300 may be disposed at a predetermined interval.

The first support member 380 may be coupled to the lens module 100 and the movable member 300. For example, one end of the first support member 380 may contact or be coupled to the lens module 100, and the other end of the first support member 380 may be coupled to the movable member 300. In addition, the first support member 380 may be formed at intervals in one direction. For example, the first support member 380 may be formed in the short axis direction or the width direction of the movable member 300. Alternatively, the first support member 380 may be formed in the short axis direction or the width direction of the fixed member 400.

Figure 13:
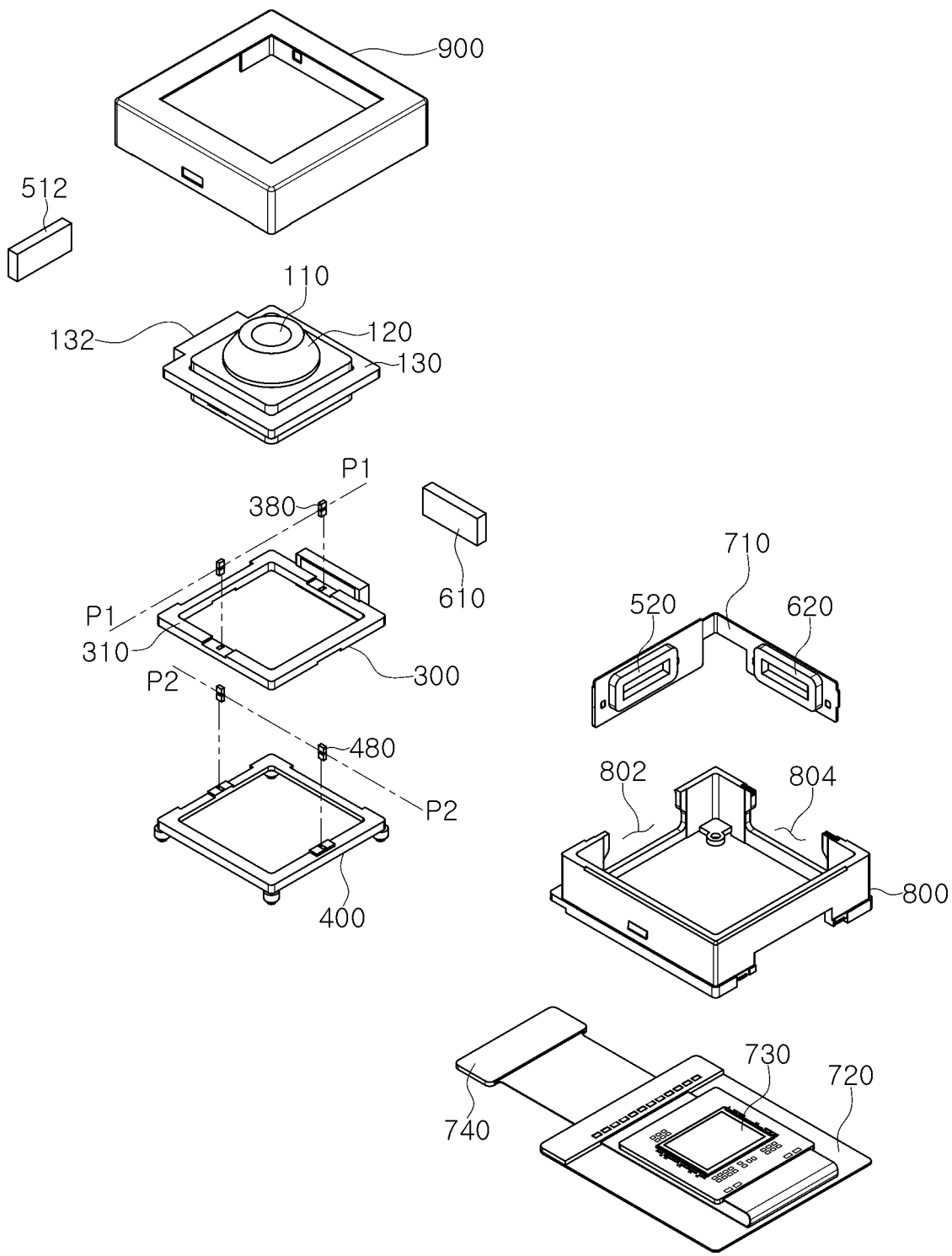
FIG. 13 is an exploded perspective view of a camera module, according to another example.

The first support member 380 may be formed so that the lens module 100 may smoothly rotate. For example, one end of the first support member 380 may be formed to have a substantially curved surface to be in line contact or in rolling contact with a fitting groove of the lens module 100. A contact point or a coupling point between the first support member 380 and the lens module 100 may be substantially located on the virtual first axis P1. Accordingly, the lens module 100 may be rotated around a contact point with the first support member 380. As another example, the first support member 380 may enable rotation of the lens module 100 through elastic deformation. For example, the first support member 380 may be formed of a material easily elastically deformed by an external force or provided with a groove 382 formed as illustrated in FIG. 13 to facilitate bending deformation by an external force.

The fixed member 400 is disposed below the movable member 300 and is configured to support the movable member 300. For example, the fixed member 400 may support the movable member 300 to enable rotation of the movable member 300 via the second support member 480. In addition, the fixed member 400 may be configured to be coupled to the housing 800. For example, the fixed member 400 may be fixed to an inner side of the housing 800 not to move.

The second support member 480 is disposed between the movable member 300 and the fixed member 400. The second support member 480 may support the movable member 300 to enable rotation of the movable member 300 as described above. In addition, the second support member 480 may be formed to have a predetermined height. For example, the second support member 480 may be formed at a predetermined height in the direction of the optical axis C so that the movable member 300 and the fixed member 400 may be disposed at a predetermined interval.

The second support member 480 may be coupled to the movable member 300 and the fixed member 400. For example, one end of the second support member 480 may contact or be coupled to the movable member 300, and the other end of the second support member 480 may be coupled to the fixed member 400. In addition, the second support member 480 may be formed at intervals in one direction. For example, the second support member 480 may be formed in the short axis direction or the width direction of the fixed member 400.

The second support member 480 may be formed so that the movable member 300 may smoothly rotate. For example, one end of the second support member 480 may be formed to have a substantially curved surface to be in line contact or rolling contact with a fitting groove of the movable member 300. A contact point or a coupling point between the second support member 480 and the fixed member 400 may be substantially located on the virtual second axis P2. Accordingly, the movable member 300 may be rotated around a contact point with the second support member 480. As another example, the second support member 480 may enable rotation of the movable member 300 through elastic deformation. For example, the second support member 480 may be formed of a material easily elastically deformed by an external force or provided with a groove 482 formed as illustrated in FIG. 13 to facilitate bending deformation by an external force.

The lens module 100, the movable member 300, and the fixed member 400 may be sequentially disposed in the optical axis C direction. For example, the movable member 300 may be disposed below the lens module 100, and the fixed member 400 may be disposed below the movable member 300. In addition, the lens module 100, the movable member 300, and the fixed member 400 may be disposed at predetermined intervals. For example, the lens module 100 and the movable member 300 may be disposed at a first interval to enable rotation of the lens module 100, and the movable member 300 and the fixed member 400 may be disposed at a second interval to enable rotational driving of the movable member 300. The first interval and the second interval may have the same size. However, the first interval and the second interval do not necessarily have the same size. The movable member 300 and the fixed member 400 may be formed to have substantially the same size and shape. For example, the movable member 200, the second movable member 300, and the fixed member 400 may be formed to have a substantially quadrangular frame shape.

However, the shape of the second movable member 300 and the fixed member 400 is not limited to a quadrangular shape.

The first driving unit 500 may provide driving force required for rotational driving of the first movable member 200. For example, the first driving unit 500 may provide driving force to one side of the first movable member 200 to enable rotational driving of the first movable member 200. The first driving unit 500 may include a first driving magnet 510 and a first driving coil 520. The first driving magnet 510 may be disposed on the lens module 100, and the first driving coil 520 may be disposed on the housing 800 or the first substrate 710. The first driving magnet 510 and the first driving coil 520 may be disposed to face each other. For example, the first driving coil 520 may be disposed on one side of the housing 800 to be closest to the first driving magnet 510 and to face the first driving magnet 510.

The second driving unit 600 may provide driving force required for rotational driving of the movable member 400. For example, the second driving unit 600 may provide driving force to one side of the movable member 400 to enable rotation of the second movable member 300. The second driving unit 600 may include a second driving magnet 610 and a second driving coil 620. The second driving magnet 610 may be disposed on the movable member 300, and the second driving coil 620 may be disposed on the housing 800 or the first substrate 710. In addition, the second driving magnet 610 and the second driving coil 620 may be disposed to face each other. For example, the second driving coil 620 may be disposed on one side of the housing 800 to be closest to the second driving magnet 610 and to face the second driving magnet 610.

The first driving unit 500 and the second driving unit 600 may be disposed to generate driving force in directions intersecting each other. For example, the first driving unit 500 may be disposed near the first side of the lens module 100, and the second driving unit 600 may be disposed near the second side of the lens module 100. As another example, the first driving magnet 510 and the first driving coil 520 of the first driving unit 500 may be disposed substantially parallel to the first axis P1, and the driving magnet 610 and the second driving coil 620 of the second driving unit 600 may be disposed substantially parallel to the second axis P2. Accordingly, the first driving unit 500 and the second driving unit 600 may drive the lens module 100 to rotate in different directions to perform image stabilization.

The first substrate 710 may be connected to the first driving unit 500 and the second driving unit 600. For example, the first substrate 710 may be electrically connected to the first driving coil 520 of the first driving unit 500 and the second driving coil 620 of the second driving unit 600. The first substrate 710 may enable control of the first driving unit 500 and the second driving unit 600. For example, the first substrate 710 may be electrically connected to the second substrate 720 provided with a control device to transmit a control signal of the second substrate 720 to the first driving unit 500 and the second driving unit 600. The first substrate 710 may be configured to be bent and deformed. For example, the first substrate 710 may be formed of a flexible material. The first substrate 710 may be disposed on the housing 800. For example, the first substrate 710 may be disposed on the housing 800 so that the first driving coil 520 and the second driving coil 620 are disposed in the openings 802 and 804 of the housing 800.

The second substrate 720 may be disposed on one side of the housing 800. For example, the second substrate 720 may be disposed below the housing 800. The second substrate 720 may include an image sensor 730 for converting an optical signal into an electrical signal. In addition, the second substrate 720 may further include a passive element required for driving the image sensor 730, and the like. The second substrate 720 may be electrically connected to the first substrate 710. For example, the second substrate 720 may be electrically connected to the first substrate 710 through a separate member. A connector 740 connecting the camera module 14 and an electronic device, e.g., a portable terminal, may be disposed on the second substrate 720.

The housing 800 may be configured to accommodate the lens module 100, the second movable member 300, the fixed member 400, the first driving unit 500, and the second driving unit 600. For example, the housing 800 may be formed to have a polyhedron shape having an accommodation space to accommodate the aforementioned members. However, the shape of the housing 800 is not limited to a polyhedron. The housing 800 may be formed to allow the first driving unit 500 and the second driving unit 600 to be disposed. For example, openings may be formed in two different side surfaces of the housing 800, such that the first driving coil 520 and the second driving coil 620 may face the first driving magnet 510 and the second driving magnet 610.

The shield can 900 may be configured to protect major components of the camera module 14 from harmful electromagnetic waves or external shocks. For example, the shield can 900 is configured to surround the exterior of the housing 800 to prevent malfunction of the first driving unit 500 and the second driving unit 600 due to harmful electromagnetic waves. In addition, the shield can 900 may reduce damage to the lens module 100, the movable member 300, the fixed member 400, the first driving unit 500, the second driving unit 600, and the housing 800 due to external impacts.

Figure 14:
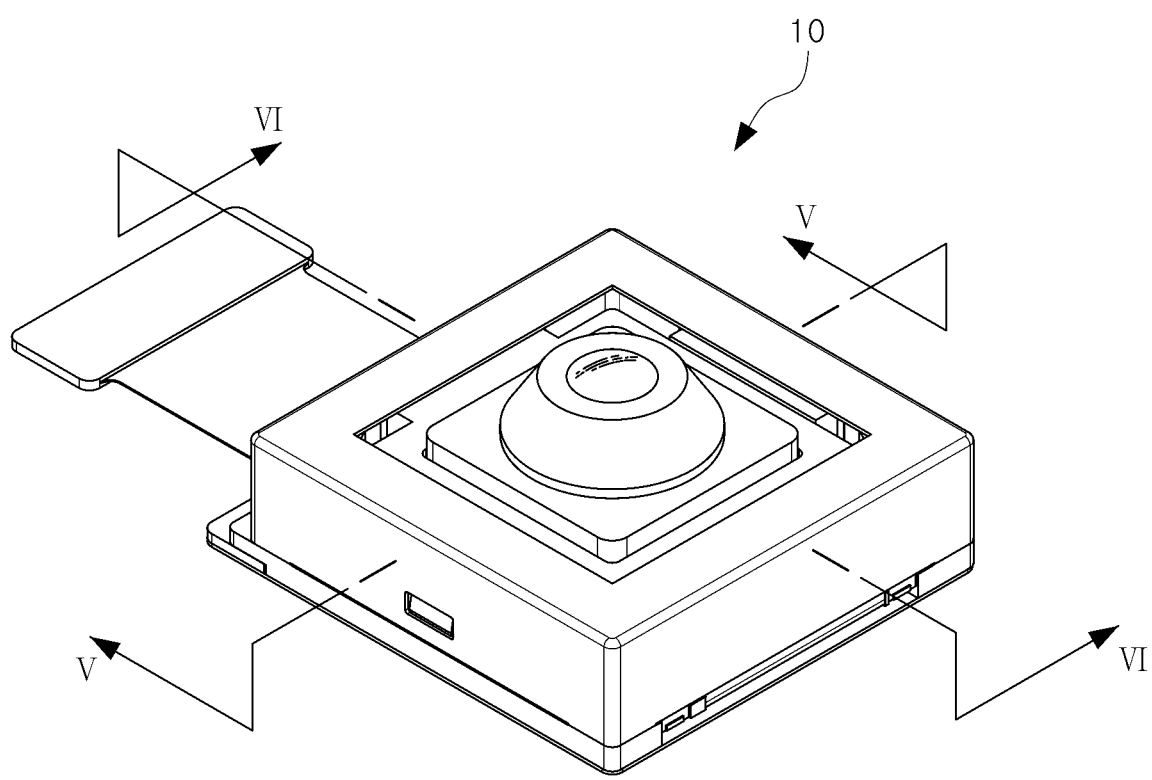
FIG. 14 is a perspective view of the camera module illustrated in FIG. 13.

The camera module 14 configured as above has a thin structure, as illustrated in FIG. 14, and thus may be easily mounted on a portable terminal.

Next, according to another example, an operating state of a camera module will be described with reference to FIGS. 15 to 18.

The camera module 14, according to an example, may perform image stabilization through a rotational motion or a trajectory motion of the lens module 100.

Figure 15:
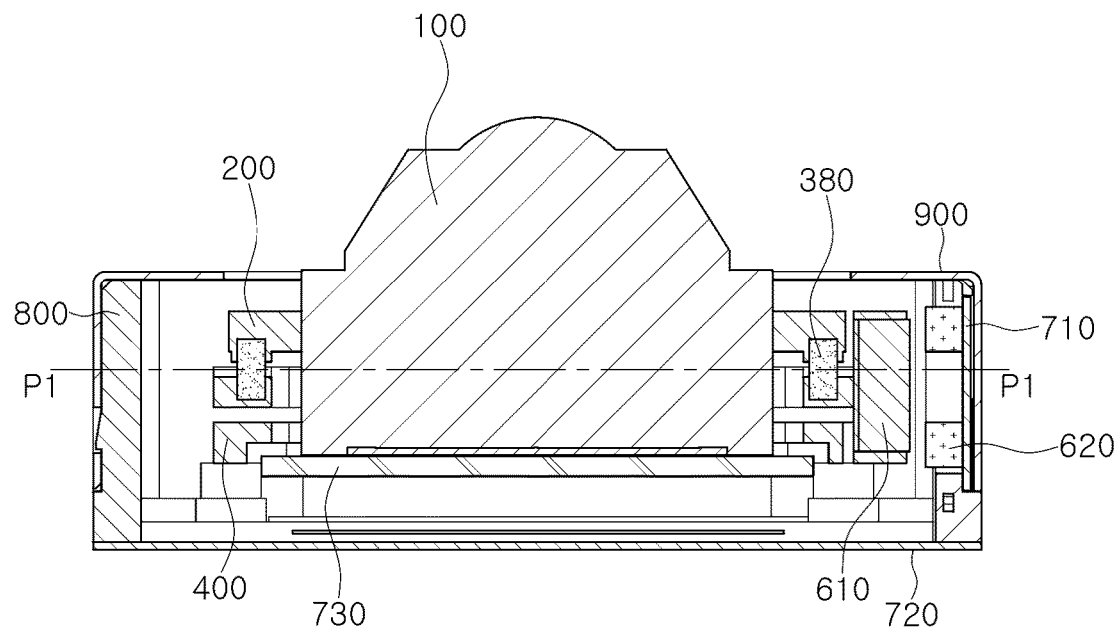
FIGS. 15 to 18 are cross-sectional perspective views and partially cut-away perspective views of the camera module illustrated in FIG. 14.
Figure 16:
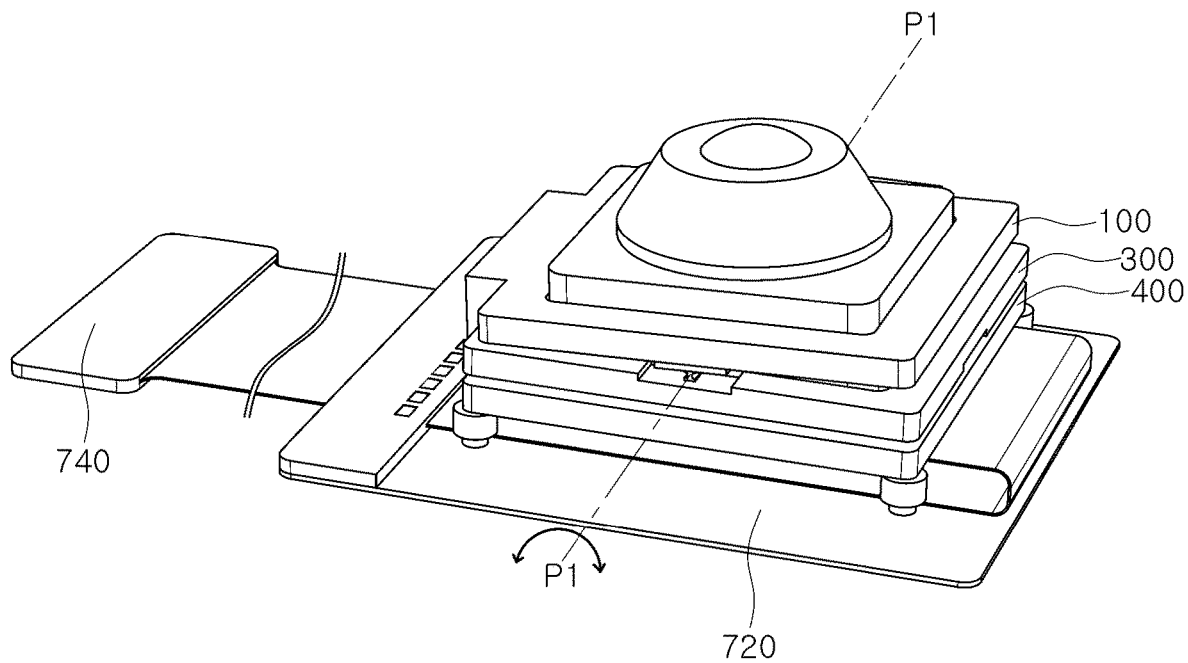

As an example, the camera module 14 may correct shaking acting in the direction of the second axis P2 By rotating the lens module 100 around the virtual first axis P1 as illustrated in FIGS. 15 and 16.

The rotational driving of the lens module 100 may be performed by the first driving unit 500. For example, when shaking in the direction of the second axis P2 is detected, the control device of the camera module 14 may drive the first driving unit 500 to rotate the lens module 100.

The first driving unit 500 may rotate the lens module 100 around the virtual first axis P1. For example, the lens module 100 may be rotated clockwise or counterclockwise due to an interaction between the first driving magnet 510 and the first driving coil 520. The lens module 100 may be rotated around a coupling point with the first support member 380 or the groove 382 of the first support member 380. The coupling point between the lens module 100 and the first support member 380 or the groove 382 may be formed substantially on the first axis P1.

Figure 17:
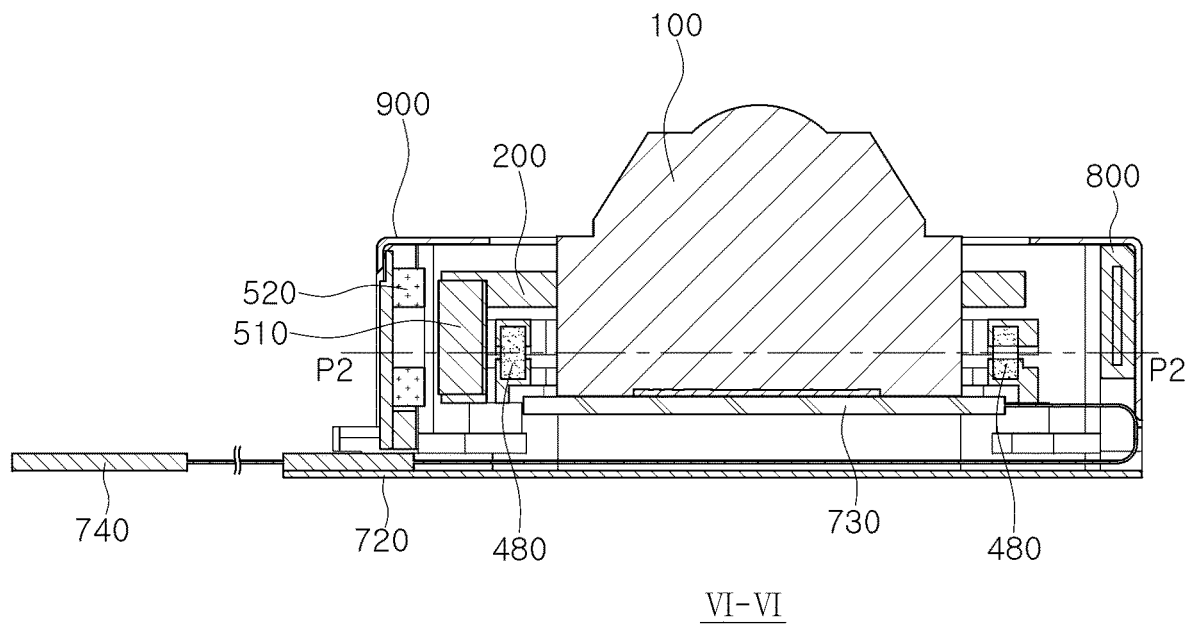
Figure 18:
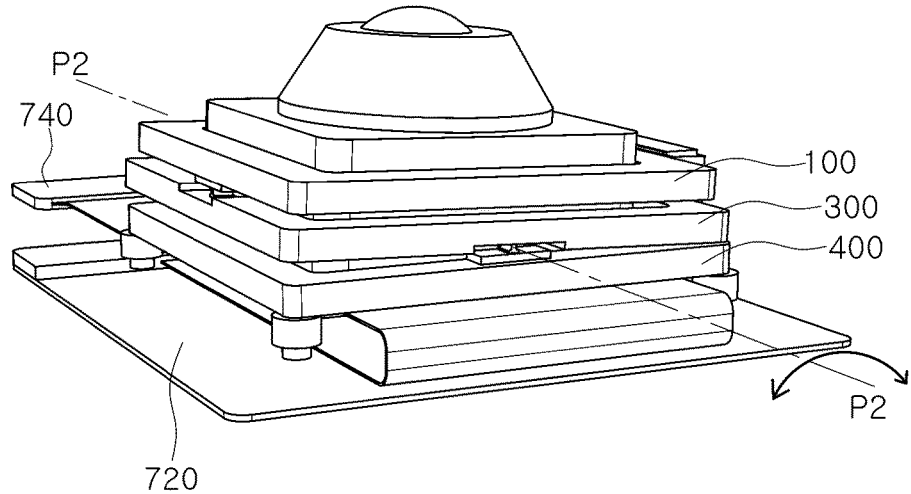

As another example, the camera module 14 may correct shaking acting in the direction of the first axis P1 by rotating the lens module 100 and the movable member 300 around the virtual second axis P2 as illustrated in FIGS. 17 and 18.

The rotational driving of the lens module 100 and the movable member 300 may be performed by the second driving unit 600. For example, when shaking in the direction of the first axis P1 is detected, the control device of the camera module 14 may drive the second driving unit 600 to rotate the movable member 300.

The second driving unit 600 may rotate the movable member 300 around the virtual second axis P2. For example, the movable member 300 may be rotated clockwise or counterclockwise due to an interaction between the second driving magnet 610 and the second driving coil 620. In addition, the movable member 300 may be rotated around a coupled point with the second support member 480 or a groove 482 of the second support member 480. The coupling point between the movable member 300 and the second support member 480 or the groove 482 may be formed substantially on the second axis P2. The lens module 100 is disposed on the second movable member 300 and may thus be rotated in the same direction as the movable member 300 when the movable member 300 is driven to rotate.

As another example, the camera module 14 may correct shaking in directions of the first axis P1 and the second axis P2 by rotating the lens module 100 at the same time around the virtual first axis P1 and second axis P2. In detail, the lens module 100 may be rotated about the first axis P1 and the second axis P2 by the movement of the first movable member 200 rotated by the first driving unit 500 and movement of the movable member 300 rotated by the second driving unit 600. For example, the lens module 100 may be rotated about the first axis P1 by the first driving unit 500 and at the same time rotated about the second axis P2 by the second driving unit 600. As another example, the lens module 100 may be rotated about the first axis P1 by the first driving unit 500, and then rotated about the second axis P2 by the second driving unit 600. The amount of rotation of the lens module 100 by the first driving unit 500 and the second driving unit 600 may be increased or decreased in proportion to the amount of shaking applied to the camera module 14.

The camera module 14 configured above performs image stabilization as the lens module 100 rotates around the virtual first axis P1 and second axis P2. Thus, a collision between the lens module 100 and the housing may be suppressed, and collision sound may be reduced. In addition, since in the case of the camera module 14, according to this example, the number of parts required to perform the image stabilization function may be simplified, manufacturing costs of the camera module 14 may be reduced.

As set forth above, according to an example, the camera module may significantly reduce damage to the lens module or malfunction of the camera module due to external impacts.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a lens module;
   a first movable member coupled to the lens module and configured to rotate about a first axis intersecting an optical axis of the lens module;
   a second movable member, supporting the first movable member, configured to rotate about a second axis intersecting the optical axis;
   a fixed member configured to support the second movable member;
   a first driving unit, configured to provide a first driving force required to rotate the first movable member, including a first driving magnet disposed on the first movable member; and
   a second driving unit, configured to provide a second driving force required to rotate the second movable member, including a second driving magnet disposed on the second movable member.

2. The camera module of claim 1, wherein the first driving force and the second driving force are in directions intersecting each other.

3. The camera module of claim 1, wherein the first axis and the second axis are formed passing through midpoints of opposite sides of the fixed member or a width direction of the fixed member.

4. The camera module of claim 1, wherein the first axis and the second axis are formed passing through opposite vertices of the fixed member or a diagonal direction of the fixed member.

5. The camera module of claim 1, wherein the first movable member, the second movable member, and the fixed member are sequentially disposed in the optical axis direction.

6. The camera module of claim 1, further comprising:
   a first support member disposed between the first movable member and the second movable member; and
   a second support member disposed between the second movable member and the fixed member.

7. The camera module of claim 6, wherein the first support member and the second support member are each provided with a groove enabling deformation of the first and second support members.

8. The camera module of claim 6, wherein the first support member and the second support member protrude in the optical axis direction.

9. The camera module of claim 1, further comprising a housing accommodating the first movable member, the second movable member, and the fixed member.

10. The camera module of claim 8, wherein the first driving unit further comprises a first driving coil disposed on one side of the housing to face the first driving magnet, and
   the second driving unit further comprises a second driving coil disposed on another side of the housing to face the second driving magnet.

11. A camera module comprising:
   a lens module including one or more lenses disposed in an optical axis;
   a movable member configured to support the lens module to rotate about a first axis intersecting the optical axis;
   a fixed member configured to support the movable member to rotate about a second axis intersecting the optical axis;

a first driving unit including a first driving magnet disposed on the lens module; and a second driving unit including a second driving magnet disposed on the movable member.

12. The camera module of claim 11, further comprising:

a first support member disposed on the first movable member or the second movable member and disposed in a direction of the first axis; and a second support member disposed on the second movable member or the third movable member and disposed in a direction of the second axis.

13. The camera module of claim 11, wherein the first driving magnet is disposed on a plurality of different side surfaces of the lens module.

14. The camera module of claim 13, wherein the second driving magnet is disposed on a plurality of different side surfaces of the movable member.

15. The camera module of claim 14, wherein one first driving magnet and one second driving magnet of the different side surfaces are disposed to provide driving force to a same side surface of the lens module.

16. The camera module of claim 13, wherein the first axis and the second axis are disposed in a diagonal direction of the fixed member.

* * * * *